United States Patent
Amano

(10) Patent No.: US 12,260,033 B2
(45) Date of Patent: Mar. 25, 2025

(54) OPERATION DETECTION DEVICE, OPERATION DETECTION UNIT, AND INFORMATION PROCESSING METHOD

(71) Applicant: Alps Alpine Co., Ltd., Tokyo (JP)

(72) Inventor: Takashi Amano, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/591,812

(22) Filed: Feb. 29, 2024

(65) Prior Publication Data

US 2024/0302911 A1    Sep. 12, 2024

(30) Foreign Application Priority Data

Mar. 9, 2023   (JP) .................. 2023-036263

(51) Int. Cl.
  *G06F 3/044* (2006.01)
  *G06F 3/039* (2013.01)
  *G06F 3/041* (2006.01)

(52) U.S. Cl.
  CPC .......... *G06F 3/0393* (2019.05); *G06F 3/0416* (2013.01); *G06F 3/044* (2013.01)

(58) Field of Classification Search
  CPC ...... G06F 3/0393; G06F 3/0416; G06F 3/044; G06F 3/04186
  See application file for complete search history.

(56) References Cited

U.S. PATENT DOCUMENTS

| | | | |
|---|---|---|---|
| 2013/0100043 A1* | 4/2013 | Kolbe | B64D 43/00 345/173 |
| 2014/0104194 A1* | 4/2014 | Davidson | G06F 3/0447 345/173 |
| 2019/0324583 A1* | 10/2019 | Smith | G06F 3/0393 |
| 2020/0081603 A1* | 3/2020 | Smith | G06F 3/04186 |

FOREIGN PATENT DOCUMENTS

| | | |
|---|---|---|
| JP | 2020190832 | 11/2020 |
| WO | WO 2018/060384 | 4/2018 |

OTHER PUBLICATIONS

Extended European Search Report from EP 24 16 1364, Jul. 11, 2024, 5 pgs.

* cited by examiner

*Primary Examiner* — Pegeman Karimi
(74) *Attorney, Agent, or Firm* — Crowell & Moring LLP

(57) ABSTRACT

A control unit of an operation detection device detects an operation on a ring-shaped guide member is started on the basis of a detection result of a sensor panel, excludes a resting region corresponding to a region where the finger rested on an upright portion can be positioned from a region where a touch is enabled before the start of the operation on the ring-shaped guide member is detected, and includes the resting region in the region where the touch is enabled after the start of the operation on the ring-shaped guide member is detected.

8 Claims, 18 Drawing Sheets

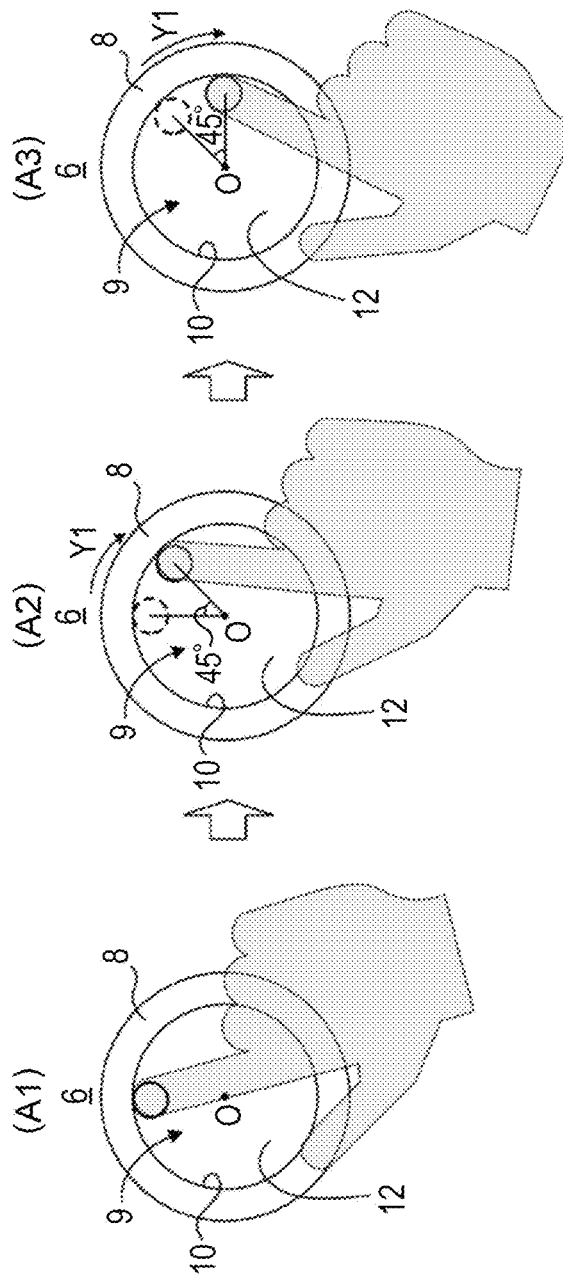
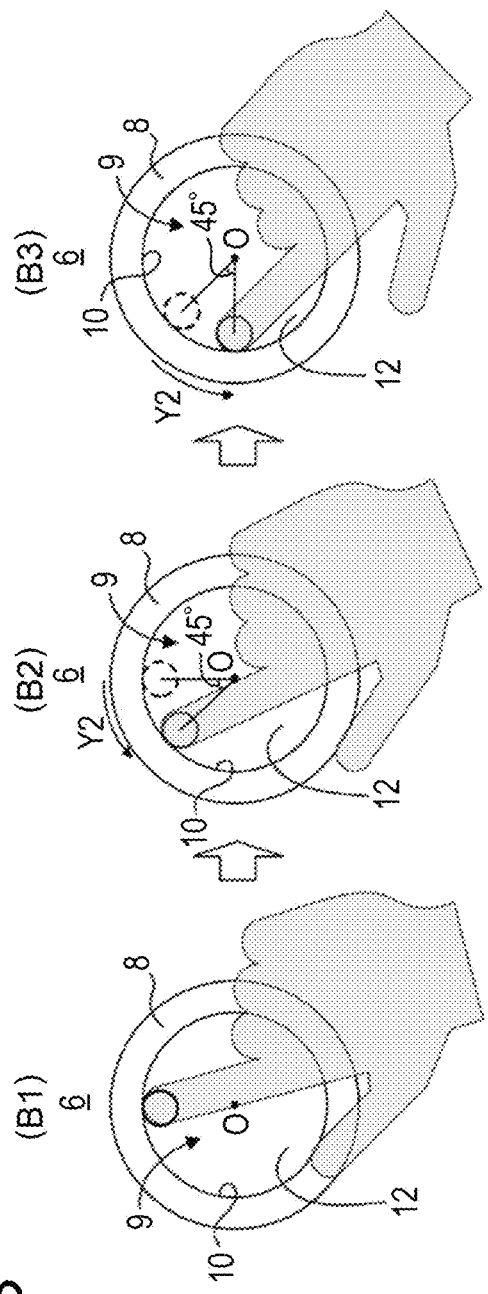
FIG. 3A
FIG. 3B

FIG. 6

| 1 | 2 | 2 | 6 | 3 | 2 | 1 |
|---|---|---|---|---|---|---|
| 1 | 31 | 45 | 65 | 55 | 30 | 0 |
| 3 | 32 | 66 | 77 | 61 | 30 | 1 |
| 0 | 26 | 63 | 87 | 64 | 20 | 0 |
| 2 | 41 | 64 | 61 | 60 | 15 | 0 |
| 4 | 23 | 19 | 22 | 14 | 8 | 1 |
| 1 | 3 | 1 | 0 | 0 | 2 | 0 |

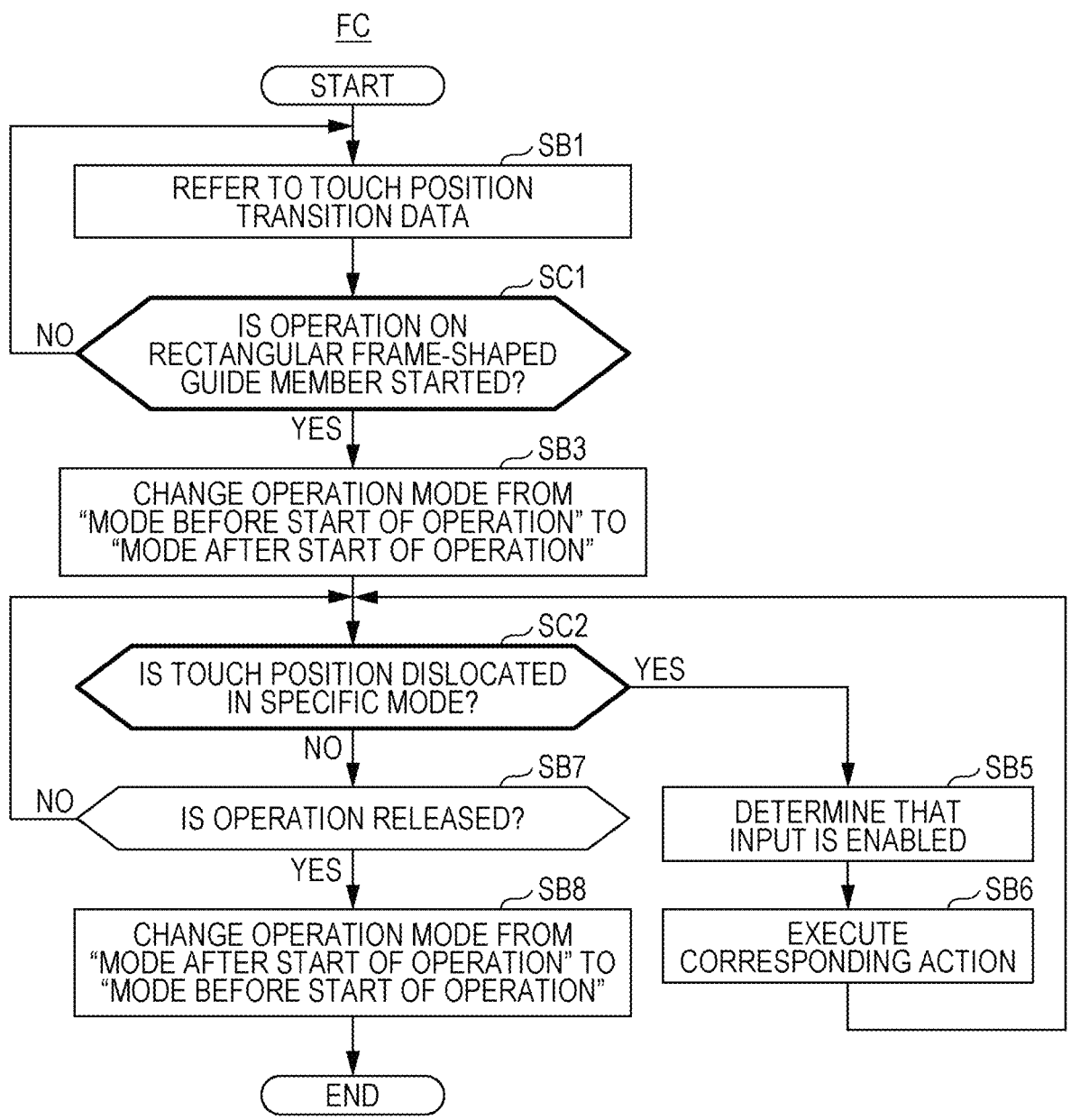

OPERATION DETECTION DEVICE, OPERATION DETECTION UNIT, AND INFORMATION PROCESSING METHOD

RELATED APPLICATION

The present application claims priority to Japanese Patent Application No. 2023-036263, filed Mar. 9, 2023, the entirety of which is herein incorporated by reference.

BACKGROUND

1. Field

The present disclosure relates to an operation detection device, an operation detection unit, and an operation detection method, and is particularly suitable for use in an operation detection device that detects an operation on a guide member fixed onto a detection surface of an electrostatic capacitive sensor panel, an operation detection unit including the sensor panel and the operation detection device, and an information processing method by the operation detection device.

2. Description of the Related Art

In the related art, an input device including an electrostatic capacitive sensor panel is known (see, for example, JP 2020/190832 A). Note that, JP 2020/190832 A describes an input display device S1 (input device) including a display unit 11 and a touch panel 2 (sensor panel), in which a part of the touch panel 2 is curved to form a recess. In addition, in the related art, an input device including a sensor panel and a guide member fixed onto a detection surface of the sensor panel is known. Hereinafter, the input device including such a guide member will be referred to as an "input device with a guide member" to facilitate description.

FIG. 18 is a front view illustrating an example of an input device X1 with a guide member, and FIG. 19 is a cross-sectional view taken along the line A-A of FIG. 18. The input device X1 with a guide member illustrated in FIGS. 18 and 19 is very simplified. As illustrated in FIGS. 18 and 19, the input device X1 with a guide member includes a sensor panel X2, a cover member X3 provided on a front surface of the sensor panel X2, and a guide member X4 fixed to the cover member X3. The guide member X4 is fixed to the cover member X3. As illustrated in FIGS. 18 and 19, the guide member X4 has a ring-shaped upright portion X5 in front view.

In the input device X1 with a guide member of the related art illustrated in FIGS. 18 and 19, an operation on the guide member X4 is performed by the following method. FIG. 20 is an enlarged view of the periphery of the guide member X4 for explaining the operation on the guide member X4. In FIG. 20, a circle is marked at a point where a finger touches or approaches. As illustrated in (A) in FIG. 20, first, the finger of the user is disposed to touch an inner side wall X6 of the upright portion X5 of the guide member X4 and to touch the inner bottom surface of the side wall X6. Thereafter, as illustrated in (B) and (C) in FIG. 20, the finger of the user moves along the side wall X6 while being in contact with the side wall X6 of the upright portion X5, whereby the operation on the guide member X4 is performed. An operation detection device (not illustrated) having a function of detecting an operation detects that the above-described operation is performed on the basis of a detection result of the sensor panel X2.

In the input device X1 with a guide of the related art, a touch is not enabled in a region corresponding to a region where the finger rested on the upright portion X5 can be positioned. The reason thereof is as follows. That is, the upright portion X5 also has a function of transmitting the presence of the upright portion X5 by a tactile sense. With this function, even in a state where the user does not see the input device X1 with a guide at all or hardly, when the user moves the finger on the surface of the input device X1 with a guide and the finger touches the upright portion X5, the user can recognize that the upright portion X5 exists at the position. As described above, the upright portion X5 is a portion that may be touched by the user in a state where the user does not intend to make any input, and in a case where a touch is enabled even for the region corresponding to the region where the finger rested on the upright portion X5 can be positioned, the touch may be detected when the user touches the upright portion X5, and a malfunction may occur due to the touch.

SUMMARY

However, the detection of the operation on the guide member of the above-described input device with a guide member of the related art has the following problems. Hereinafter, the problems of the input device with a guide member of the related art will be described using the input device X1 with a guide member. As described above, in the input device X1 with a guide member, the finger of the user moves along the side wall X6 while being in contact with the side wall X6 of the upright portion X5, thereby performing the operation on the guide member X4. During this operation, while the finger is moving along the side wall X6, the finger may be rested on the upright portion X5. (D) in FIG. 20 illustrates a state in which the finger is rested on the upright portion X5 at the timing of (B) in FIG. 20. At this time, as described above, since the touch is not enabled in the region corresponding to the region where the finger rested on the upright portion X5 can be positioned, the operation detection device of the related art determines that the operation on the guide member X4 is interrupted when the finger is rested on the upright portion X5. In this case, input desired by the user is not determined to be enabled, and the user needs to perform the operation again from the beginning, which may lead to a decrease in user satisfaction and convenience. Note that, it is naturally necessary to suppress a situation in which a touch is detected when the user touches the upright portion X5 in a state where the user does not intend to make any input and a malfunction occurs due to the touch.

The above problems are not limited to the input device including the guide member having the ring-shaped upright portion in the front view, as in the input device X1 with a guide member, but may widely occur in the input device including the guide member having the upright portion extending in the state of protruding with respect to the detection surface.

The present disclosure has been made to solve such problems, and an object thereof is to suppress the determination that an operation on a guide member having an upright portion extending in the state of protruding with respect to a detection surface is interrupted against the intention of the user while suppressing the occurrence of a malfunction.

In order to solve the above problems, an operation detection device according to the present disclosure has the following configuration. That is, the operation detection device according to the present disclosure detects an operation on a guide member fixed onto a detection surface of an electrostatic capacitive sensor panel. In addition, the guide member is a member that has an upright portion extending in the state of protruding forward with respect to the detection surface and is assumed to be used for an operation in which a finger of a user moves along a side wall of the upright portion while being in contact with the side wall. Then, the operation detection device has a function of detecting that the operation on the guide member is started on the basis of a detection result of the sensor panel, excludes a resting region corresponding to a region where the finger rested on the upright portion can be positioned from a region where a touch is enabled before the start of the operation on the guide member is detected, and includes the resting region in the region where a touch is enabled after the start of the operation on the guide member is detected.

According to the present disclosure configured as described above, before the operation on the guide member is started, the touch is not enabled in the region corresponding to the region where the finger rested on the guide member can be positioned, and thus, a malfunction that may occur when the user touches the upright portion in a state where the user does not intend to make any input is suppressed. In addition, after the operation on the guide member is started, the touch is enabled in the region corresponding to the region where the finger rested on the guide member can be positioned, and thus, even in a case where the finger is rested on the upright portion while the user is moving the finger during the operation, it is not determined that the operation is interrupted, and it is possible to suppress the determination that the operation is interrupted against the intention of the user.

BRIEF DESCRIPTION OF THE DRAWINGS

FIGS. 3A and 3B are diagrams illustrating a usage mode of a ring-shaped guide member;

FIG. 6 is a diagram illustrating a detected electrostatic capacitance correspondence value written at each detected point of a detection surface;

FIG. 15 is a flowchart illustrating the information processing method by the operation detection device according to one embodiment of the present disclosure;

DETAILED DESCRIPTION

Figure 1:
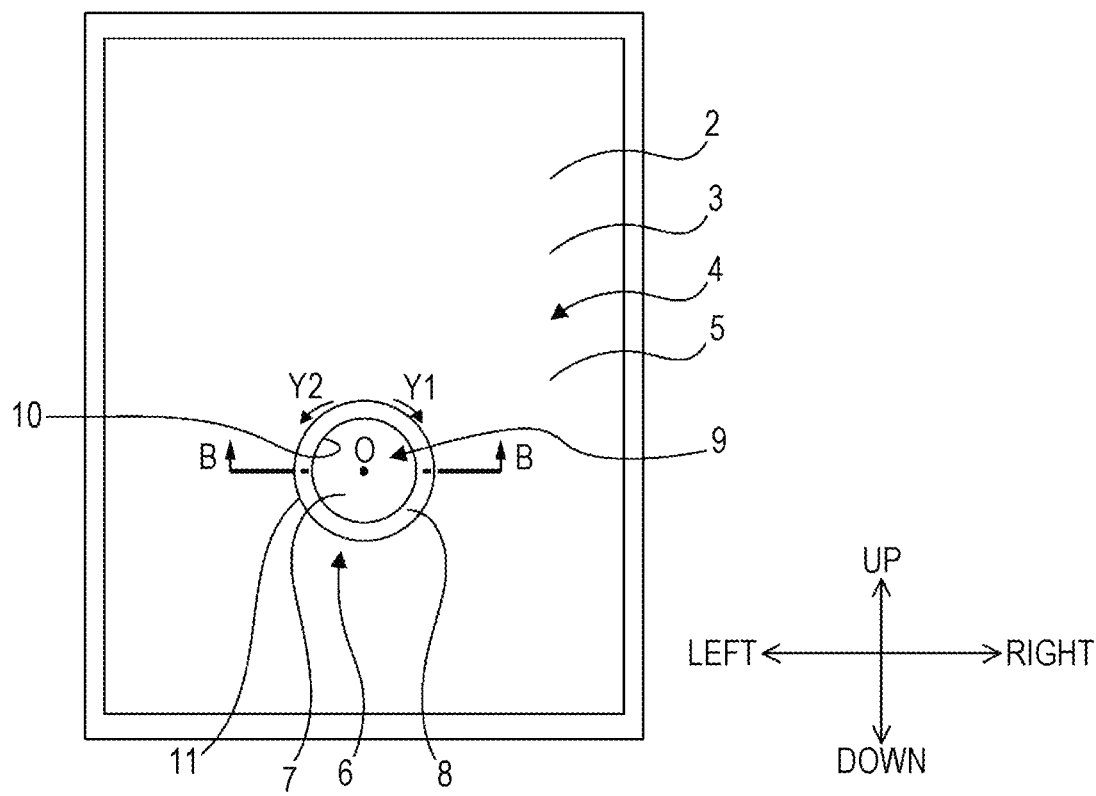
FIG. 1 is a front view illustrating a display input device according to one embodiment of the present disclosure.
Figure 2:
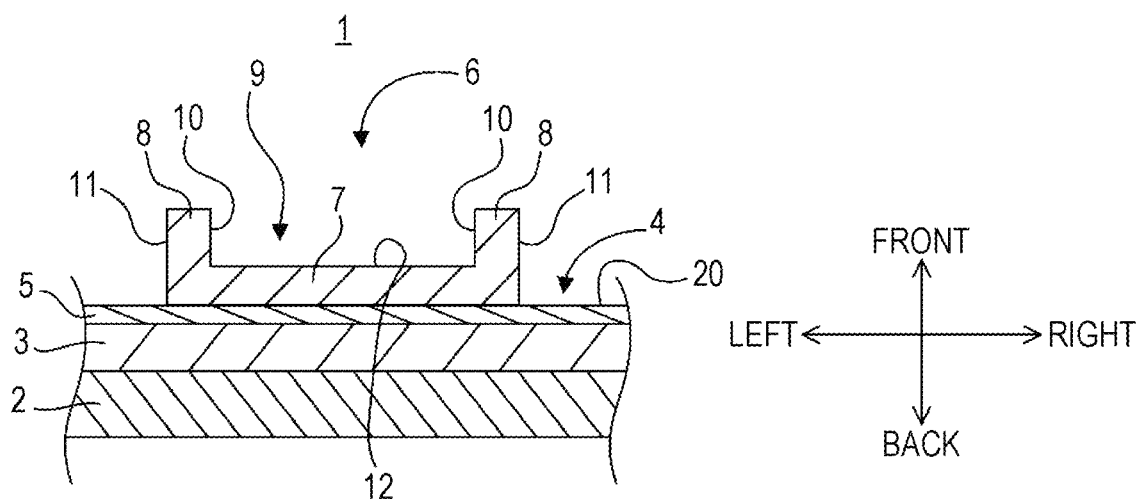
FIG. 2 is a cross-sectional view taken along the line B-B of FIG. 1.

Hereinafter, embodiments of the present disclosure will be described based on the drawings. FIG. 1 is a front view illustrating a display input device 1 (input device) according to an embodiment. FIG. 2 is a cross-sectional view taken along the line B-B of FIG. 1. The display input device 1 illustrated in FIGS. 1 and 2 is illustrated with a simplified structure of the device. Hereinafter, the front-rear direction, the left-right direction, and the up-down direction based on the display input device 1 are defined as indicated by arrows in FIGS. 1 and 2.

The display input device 1 includes a display panel 2 such as a liquid crystal display or an organic EL panel, and a sensor panel 3 disposed to overlap the display panel 2. A detection surface 4 for detecting an operation by a user is formed on the sensor panel 3. The sensor panel 3 will be described in detail below. The display input device 1 has a function of displaying a video on the display panel 2, and a function of receiving an operation on the detection surface 4 from the user. The display input device 1 is provided on, for example, an instrument panel of a vehicle, a center console of the vehicle, or another predetermined location of vehicle. However, a location where the display input device 1 is provided is not limited to the illustrated location.

As illustrated in FIGS. 1 and 2, a cover member 5 made of glass or another transparent member is disposed on a front surface of the sensor panel 3. A ring-shaped guide member 6 (guide member) is provided in the cover member 5. The ring-shaped guide member 6 is fixed to the cover member 5 by adhesion or other units. That is, the ring-shaped guide member 6 is fixed onto the detection surface 4 of the sensor panel 3 with the cover member 5. The ring-shaped guide member 6 is a transparent member containing a transparent material. However, the ring-shaped guide member 6 may not be transparent. In this embodiment, the ring-shaped guide member 6 is separate from the cover member 5, but such members may be integrated.

As illustrated in FIGS. 1 and 2, the ring-shaped guide member 6 includes a disk-shaped base portion 7 of which the back surface adheres to the cover member 5, and an upright portion 8 provided to surround the base portion 7. As illustrated in FIGS. 1 and 2, the upright portion 8 is a ring-shaped portion in a front view, and a circular region 9 is formed inside the upright portion. The upright portion 8 is a portion extending in the state of protruding forward with respect to the detection surface 4, an inner side wall 10 (side wall) is formed inside the upright portion, and an outer side wall 11 is formed outside the upright portion. The inner side wall 10 is formed to rise by a certain distance from a bottom surface 12 (the surface of the base portion 7 belonging to the circular region 9).

The ring-shaped guide member 6 is operated in the following two modes. A first mode is a mode in which the finger of the user moves along the inner side wall 10 so as to rotate around a central portion O (FIG. 1) of the upright portion 8 in a clockwise direction Y1 (FIG. 1) while touching the inner side wall 10 of the upright portion 8 of the ring-shaped guide member 6. When the above operation is performed by the user, a control unit 15 of an operation detection device or an operation detector 14 described below enables the input and executes the corresponding action every time when the finger of the user rotates around the central portion O by "45°" in the clockwise direction Y1.

FIGS. 3A and 3B are views illustrating a usage mode of the ring-shaped guide member 6. In detail, referring to (A1) in FIG. 3A, in the first mode, first, the finger of the user is disposed to touch the inner side wall 10 of the upright portion 8 of the ring-shaped guide member 6 and to touch the inner bottom surface 12 of the inner side wall 10. In FIGS. 3A and 3B, a circle is marked at a point where the finger touches or approaches on the bottom surface 12. Note that, a position at which the finger is initially disposed in the operation of the ring-shaped guide member 6 is not limited to the position illustrated in (A1) in FIG. 3A, and may be any position inside the inner side wall 10. The same applies to a second mode according to the operation of the ring-shaped guide member 6. Thereafter, as illustrated in (A2) and (A3) in FIG. 3A, the finger of the user moves so as to rotate around the central portion O along the inner side wall 10 while being in contact with the inner side wall 10 of the upright portion 8, whereby the operation on the ring-shaped guide member 6 is performed.

In a case where the operations illustrated in FIG. 3A are performed, the control unit 15 of the operation detection device 14 detects that the finger rotates by 45° when the state of (A1) in FIG. 3A is changed to the state of (A2), enables the input, and executes the corresponding action. In this embodiment, as a simplified example, the control unit 15 executes an action of increasing the volume of an audio device (not illustrated) by one unit. Furthermore, the control unit 15 of the operation detection device 14 detects that the finger rotates by 45° when the state of (A2) in FIG. 3A is changed to the state of (A3), enables the input, and executes the corresponding action (the action of increasing the volume by one unit). In this manner, the user can gradually increase the volume of the audio device by moving the finger around the central portion O of the circular region 9 in the clockwise direction Y1 while bringing the finger into contact with the inner side wall 10 of the upright portion 8.

A second mode of the operation of the ring-shaped guide member 6 is an operation in which the finger of the user moves along the inner side wall 10 so as to rotate around the central portion O of the upright portion 8 in a counterclockwise direction Y2 while touching the inner side wall 10 of the upright portion 8 of the ring-shaped guide member 6. When the above operation is performed by the user, the control unit 15 of the operation detection device 14 described below enables the input and executes the corresponding action every time when the finger of the user rotates by "45°" around the central portion O in the counterclockwise direction Y2. The corresponding action is an action of decreasing the volume of the audio device by one unit.

FIG. 3B illustrates the operation according to the second mode in the same method as in FIG. 3A. In the example of FIG. 3B, when the state of (B1) in FIG. 3B is changed to the state of (B2) and when the state of (B2) in FIG. 3B is changed to the state of (B3), the input is enabled by the control unit 15 of the operation detection device 14, and the corresponding action (the action of decreasing the volume by one unit) is executed. In this manner, the user can gradually decrease the volume of the audio device by moving the finger around the central portion O of the circular region 9 in the counterclockwise direction Y2 while bringing the finger into contact with the inner side wall 10 of the upright portion 8.

Figure 20:
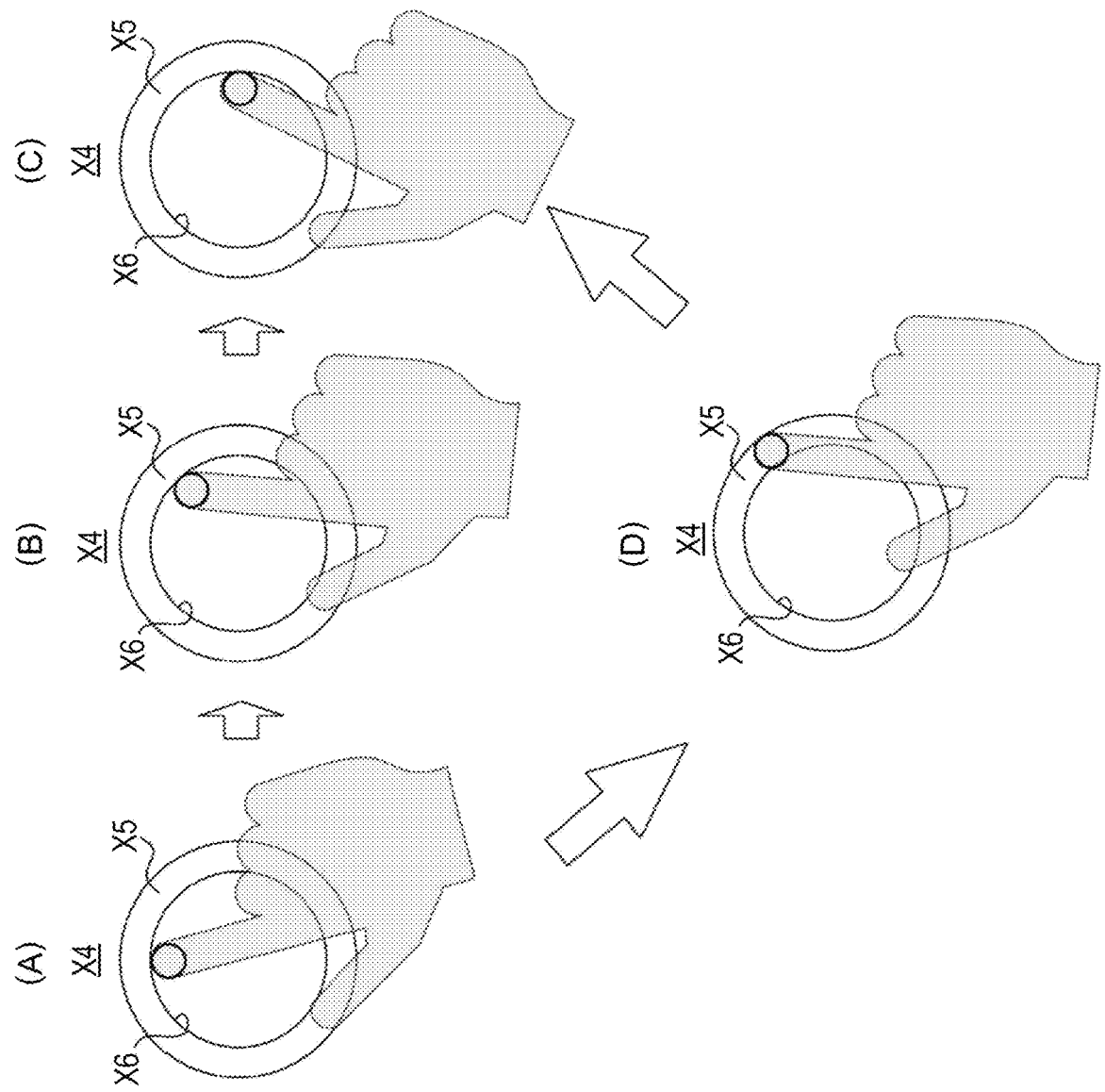
FIG. 20 is a front view illustrating the periphery of the guide member in the related art.

As described with reference to (D) in FIG. 20, the finger may be rested on the upright portion 8 while the finger is moving in the operation on the ring-shaped guide member 6. Here, the display input device 1 according to this embodiment is provided in a vehicle. Therefore, the housing of the display input device 1 may vibrate due to the vibration of an engine and other factors, and a case where the finger is rested on the upright portion 8 may easily occur due to the vibration.

Figure 4:
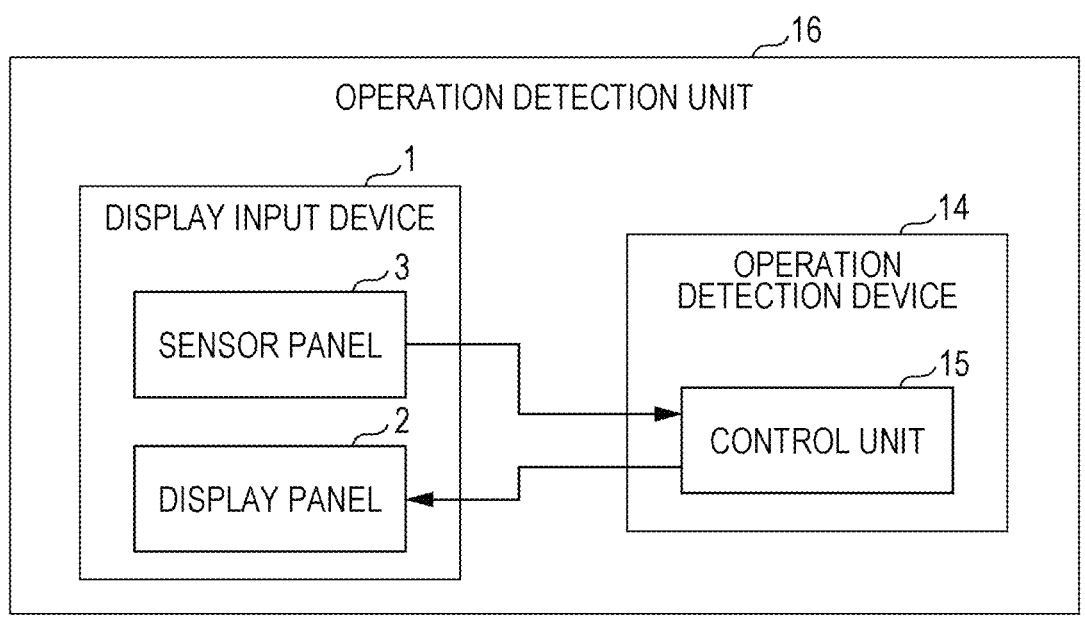
FIG. 4 is a block diagram illustrating a functional configuration example of the operation detection device according to one embodiment of the present disclosure along with a configuration of an operation detection unit.

FIG. 4 is a block diagram illustrating a functional configuration example of the operation detection device 14 according to this embodiment along with the configuration of an operation detection unit 16. As illustrated in FIG. 4, the operation detection unit 16 includes the display input device 1 and the operation detection device 14. The display input device 1 includes a display panel 2 and a sensor panel 3. The operation detection device 14 includes the control unit 15 as a functional configuration. The control unit 15 can be configured with any of hardware, a digital signal processor (DSP), and software. For example, when the control unit is configured with software, the control unit 15 actually includes a CPU, a RAM, and a ROM of a computer and is implemented by operating a program stored in a recording medium such as a RAM, a ROM, a hard disk, or a semiconductor memory.

The control unit 15 has a function of displaying a video on the display panel 2. In the following description, it is assumed that the video is appropriately displayed on the display panel 2 from the control unit 15, and the detailed description of this function will be omitted.

The control unit 15 has an electrostatic capacitance correspondence value detection function and a touch detection function. Hereinafter, these functions will be described in order.

<Electrostatic Capacitance Correspondence Value Detection Function>

First, the electrostatic capacitance correspondence value detection function will be described. The sensor panel 3 is an electrostatic capacitive touch sensor, and detected points are formed in a matrix form in the entire region of the detection surface 4 of the sensor panel 3. Each of the detected points is a point at which a change in electrostatic capacitance is detected and an electrostatic capacitance correspondence value corresponding to the change in the electrostatic capacitance is detected. An electrostatic capacitance correspondence value table is stored in a storage area such as a RAM of the operation detection device 14. In this electrostatic capacitance correspondence value table, coordinate information indicating coordinates (also functioning as identification information for uniquely identifying the detected point) and the electrostatic capacitance correspondence value detected by the control unit 15 are registered in association for all the detected points. The electrostatic capacitance correspondence value table is data in which a detection result of the sensor panel 3 is reflected. Accordingly, processing executed with reference to the electrostatic capacitance correspondence value table by the control unit 15 is processing executed based on a detection result of the sensor panel 3.

The control unit 15 detects a change in the electrostatic capacitance at all the detected points based on the detection result of the sensor panel 3 at a predetermined cycle, and detects the electrostatic capacitance correspondence value indicating the magnitude of a change in the electrostatic capacitance at all the detected points. In this embodiment, to facilitate description, it is assumed that, as the electrostatic capacitance correspondence value, a value is taken in the range of 0 to 100 points ("points" are units for convenience), and when there is no change in the electrostatic capacitance, the electrostatic capacitance correspondence value is a minimum value of 0 points, and when an assumed maximum change occurs, the electrostatic capacitance correspondence value is a minimum value of 100 points. After the control unit 15 detects the electrostatic capacitance correspondence values at all the detected points, the control unit 15 updates the electrostatic capacitance correspondence value table based on the detected electrostatic capacitance correspondence values for the detected points. As a result, at a predetermined cycle, the values of the electrostatic capacitance correspondence values of the detected points registered in the electrostatic capacitance correspondence value table are updated to the values detected by the control unit 15 most recently.

The type of sensor panel 3 may be either a self-capacitance type of panel or a mutual capacitance type of panel (of course, another scheme may be used), and the control unit 15 detects a change in the electrostatic capacitance at each detected point and detects the electrostatic capacitance correspondence value by a method corresponding to the type of sensor panel 3. As an example, the sensor panel 3 is a mutual electrostatic capacitance type of panel, and in the sensor panel 3, an X-side sensor in which a transparent electrode is patterned to detect a change in the electrostatic capacitance in a left-right direction and a Y-side sensor in which a transparent electrode is patterned to detect a change in the electrostatic capacitance in an up-down direction are provided to overlap. The control unit 15 acquires the magnitude of electrostatic capacitance of each electrode of the X-side sensor and the magnitude of electrostatic capacitance of each electrode of the Y-side sensor at a predetermined cycle, detects the magnitude of a change in the electrostatic capacitance at each detected point based on the magnitude of electrostatic capacitance, and converts the magnitude of the change in the electrostatic capacitance into the electrostatic capacitance correspondence value.

<Touch Detection Function>

Figure 5:
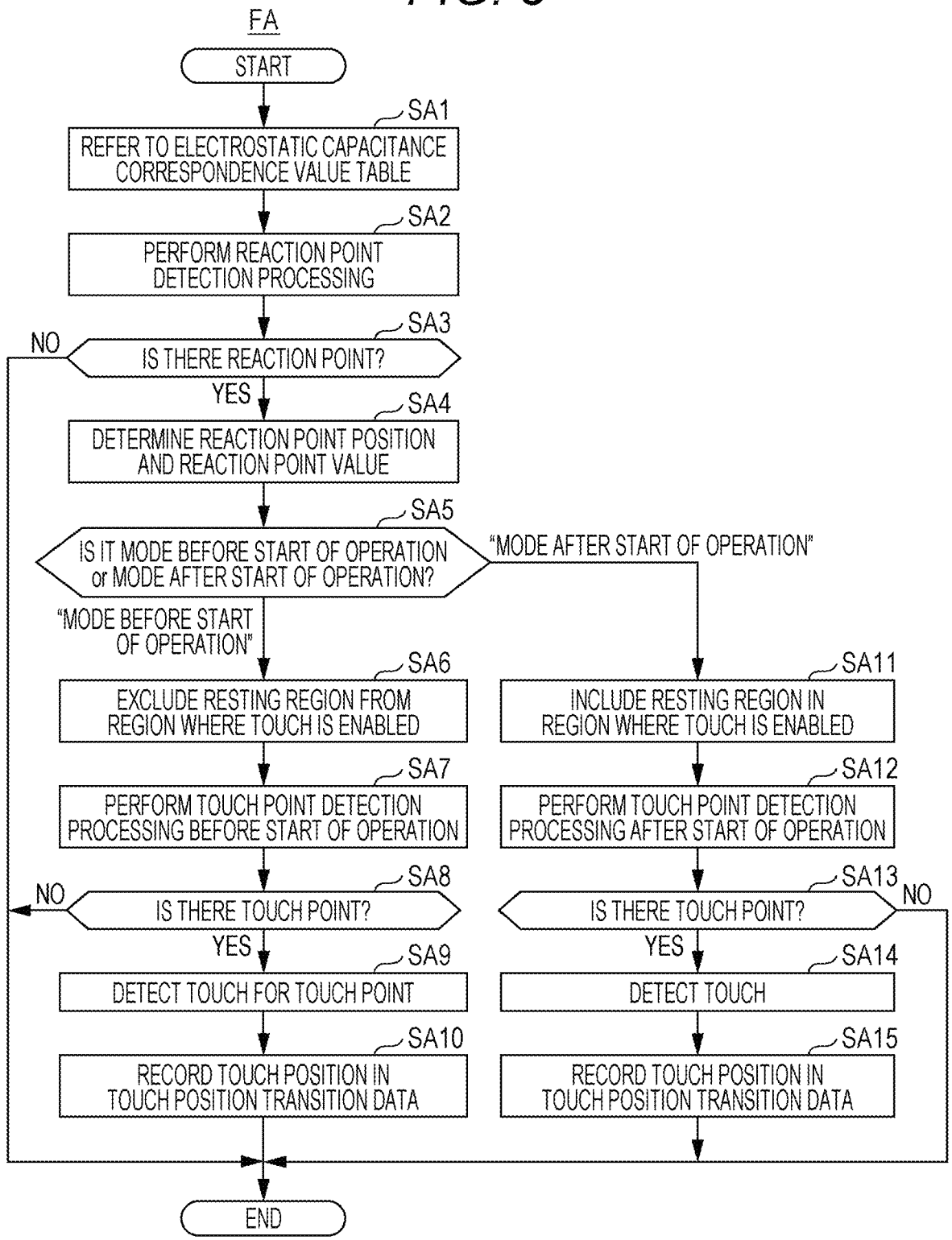
FIG. 5 is a flowchart illustrating an information processing method by the operation detection device according to one embodiment of the present disclosure.

Next, the touch detection function will be described. A flowchart FA in FIG. 5 is a flowchart illustrating an information processing method by the operation detection device 14. The control unit 15 executes the processing of the flowchart FA in FIG. 5 at a predetermined cycle.

As illustrated in FIG. 5, the control unit 15 refers to the electrostatic capacitance correspondence value table stored in a predetermined storage area (step SA1). As described above, in the electrostatic capacitance correspondence value table, the coordinate information and the most recently detected electrostatic capacitance correspondence value are registered for each of the detected points formed on the detection surface 4.

Next, the control unit 15 executes reaction point detection processing (step SA2). Reaction points A described below are a group of detected points (a set of one or more detected points adjacent to each other) at which the electrostatic capacitance correspondence value is a lowest detection threshold value TH1 or more. Hereinafter, a detected point at which the electrostatic capacitance correspondence value is the lowest detection threshold value TH1 or more is referred to as a "reaction detected point B". The lowest detection threshold value TH1 is set in advance from the viewpoint of reliable detection when the finger of the user approaches the detection surface 4. The value of the lowest detection threshold value TH1 is at least a value or less of a resting region threshold value TH2 described below. The reaction points A are the group of detected points at which the electrostatic capacitance correspondence value is the lowest detection threshold value TH1 or more. Therefore, when any object to be detected (which may not be a finger) approaches the detection surface 4 at any location on the detection surface 4, the reaction point A appears at a position corresponding to the object to be detected.

In step SA2, the control unit 15 recognizes a relationship between the position of each detected point and the electrostatic capacitance correspondence value based on the electrostatic capacitance correspondence value table, recognizes the distribution of the reaction detected points B based on the relationship, and detects the reaction point A based on the distribution. No reaction point A may be detected, or one or more reaction points A may be detected.

In this embodiment, the control unit 15 detects all a "group of reaction detected points B" as the reaction points A. However, instead of setting all the "group of reaction detected points B" as the reaction points A, the control unit 15 may be configured to detect only points that are highly likely to appear due to the finger being in proximity to the detection surface 4, among the "group of reaction detected points B", as the reaction points A. In the case of this configuration, for example, the control unit 15 does not detect the "group of reaction detected points B" in which the reaction detected points B are distributed to be elongated beyond an allowable range as the reaction points A. This is because such a distribution of the reaction detected points B occurs due to noise. For example, the control unit 15 does not detect the "group of reaction detected points B" in which the reaction detected points B are distributed in a broad (or narrow) range beyond the allowable range as the reaction points A. This is because such a distribution of the reaction detected points B occurs due to the object to be detected other than the finger being in contact with or in proximity to the detection surface 4.

After the processing of step SA2, the control unit 15 determines whether there are the reaction points A (step SA3). In a case where there is no reaction point A (step SA3: NO), the control unit 15 ends the processing of the flowchart FA. On the other hand, in a case where there are one or more reaction points A (step SA3: YES), the control unit 15 allows the processing procedure to proceed to step SA4.

In step SA4, the control unit 15 determines a reaction point position C and a reaction point value for each of the reaction points A. More specifically, the control unit 15 specifies the reaction detected point B having the highest electrostatic capacitance correspondence value, among one or more reaction detected points B (detected points of which the electrostatic capacitance correspondence value is the lowest detection threshold value TH1 or more) included in the reaction points A. Then, the control unit 15 determines the electrostatic capacitance correspondence value of the reaction detected point B having the highest electrostatic capacitance correspondence value as the reaction point value, and further determines the position as the reaction point position C.

FIG. 6 is a diagram in which the detection surface 4 is divided into a matrix form for each detected point, and an electrostatic capacitance correspondence value of each detected point is written in each cell. Now, it is assumed that the lowest detection threshold value TH1 is "60 points". It is assumed that the electrostatic capacitance correspondence value is detected for each detected point as illustrated in FIG. 6, in a certain region of the detection surface 4. In the example of FIG. 6, a reaction point A-1 is detected in a lightly painted region. In the example of FIG. 6, among the reaction detected points B belonging to the reaction point A-1, a reaction detected point B-1 having an electrostatic capacitance correspondence value of "87 points" is the reaction detected point B having the highest electrostatic capacitance correspondence value. Therefore, for the reaction point A-1, the control unit 15 determines the reaction point position C as the position of the reaction detected point B-1, and determines the reaction point value as "87 points".

A method for determining the reaction point position C and the reaction point value of the reaction point A is not limited to the method exemplified in this embodiment. For example, regarding the reaction point position C, the control unit 15 may be configured to set a position closest to the gravity center of the reaction point A as the reaction point position C. Further, for example, regarding the reaction point value, the control unit 15 may be configured to derive the reaction point value by performing some statistical calculation on the electrostatic capacitance correspondence value of the reaction detected point B included in the reaction point A.

After the processing of step SA4, the control unit 15 determines whether an operation mode is a mode before the start of the operation or a mode after the start of the operation (step SA5). The mode after the start of the operation is an operation mode in a period from when the control unit 15 detects that the operation on ring-shaped guide member 6 is started until the control unit 15 detects that the operation is released. The mode after the start of the operation is an operation mode in a period other than the "period of the mode after the start of the operation". Therefore, in a period in which the user does not perform the operation on the ring-shaped guide member 6, the operation mode is, in principle, the mode before the start of the operation. As it will be apparent later, the control unit 15 of the operation detection device 14 according to this embodiment has a function of detecting that the operation on the ring-shaped guide member 6 is started on the basis of the detection result of the sensor panel 3, and the control unit 15 switches the operation mode between the mode before the start of the operation and the mode after the start of the operation by using this function.

When the operation mode is the mode before the start of the operation (step SA5: "MODE BEFORE START OF OPERATION"), the control unit 15 excludes a resting region 18 corresponding to a region where the finger rested on the upright portion 8 can be positioned from a "region where a touch is enabled", and sets only an operation-corresponding region 19 as the region where a touch is enabled (step SA6).

Figure 7A:
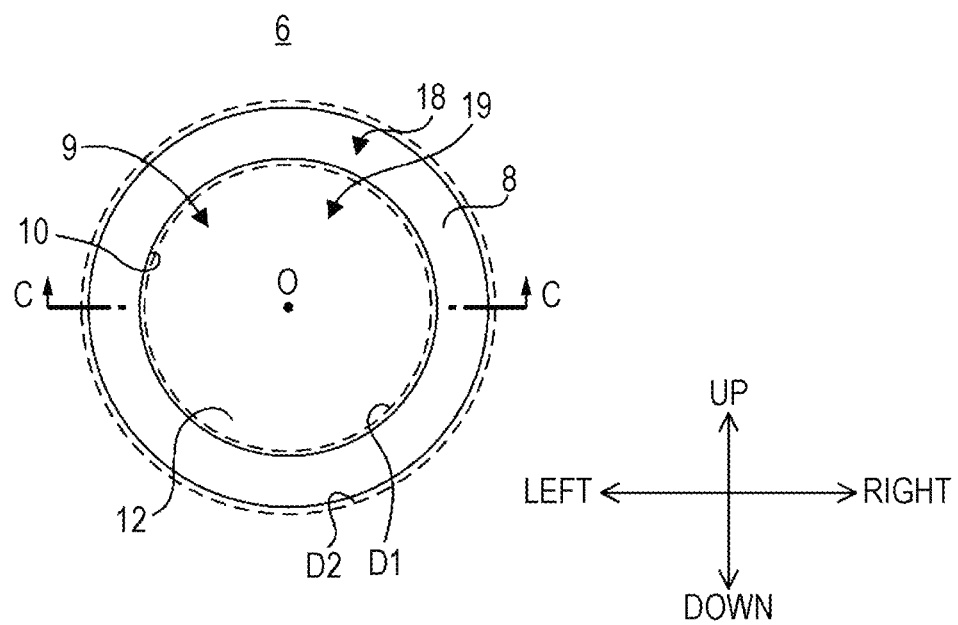
FIGS. 7A and 7B are diagrams used to describe an operation-corresponding region and a resting region.
Figure 7B:
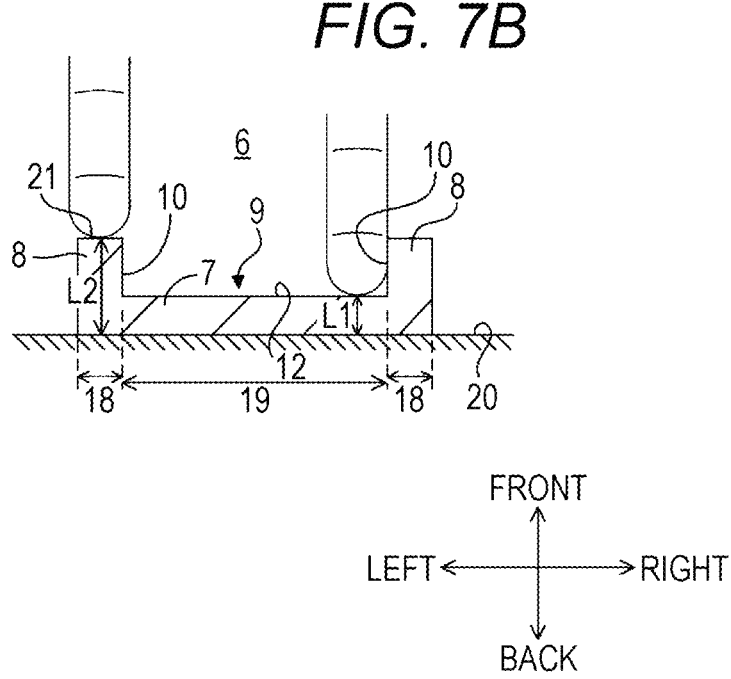

FIGS. 7A and 7B are views used to describe the operation-corresponding region 19 and the resting region 18, in which FIG. 7A is a front view of the periphery of the ring-shaped guide member 6, and FIG. 7B is a cross-sectional view taken along the line C-C of FIG. 7A. The operation-corresponding region 19 is a region where the "reaction point position C based on the finger positioned in the circular region 9 of the ring-shaped guide member 6" can be positioned. That is, when the finger approaches the detection surface 4 within the circular region 9, the reaction point position C is positioned within the operation-corresponding region 19. Therefore, while the finger is moving along the inner side wall 10 within the circular region 9, the reaction point position C based on the finger is positioned within the operation-corresponding region 19. In FIGS. 7A and 7B, the operation-corresponding region 19 is clearly illustrated. In particular, in FIG. 7A, the operation-corresponding region 19 is a region inside a circle D1 indicated by a dotted line. The operation-corresponding region 19 is a region corresponding to the circular region 9, but the outer edge of the operation-corresponding region 19 does not necessarily coincide with the outer edge of the circular region 9.

On the other hand, the resting region 18 is a region where the "reaction point position C based on the finger rested on the upright portion 8" can be positioned. That is, the resting region 18 is a region corresponding to the "region where the finger rested on the upright portion 8 can be positioned". Therefore, in a situation where the finger is rested on the upright portion 8, the reaction point position C based on the finger is positioned within the resting region 18. FIGS. 7A and 7B clearly illustrate the resting region 18. In particular, in FIG. 7A, the resting region 18 is a region outside the circle D1 indicated by the dotted line and inside a circle D2 indicated by a dotted line. The resting region 18 is the region corresponding to the "region where the finger rested on the upright portion 8 can be positioned", but the outer edge of the resting region 18 does not necessarily coincide with the outer edge when the upright portion 8 is viewed from the front.

"Including a certain region in the region where a touch is enabled" means that the control unit 15 detects the touch in a case where a predetermined condition is satisfied when the object to be detected approaches the detection surface 4 in the region. On the other hand, excluding a certain region from the "region where a touch is enabled" means that the control unit 15 does not detect any touch even in a case where in the region, the object to be detected approaches the detection surface 4 in any mode. As described above, in step SA6, the control unit 15 excludes the resting region 18 from the region where a touch is enabled, and sets only the operation-corresponding region 19 as the region where a touch is enabled. According to such processing, in the mode before the start of the operation, only the operation-corresponding region 19 is a region where a touch can be detected, and no touch is detected in the resting region 18. The significance of the processing of step SA6 will be clarified later.

After the processing of step SA6, the control unit 15 executes touch point detection processing before the start of the operation (step SA7). More specifically, the control unit 15 detects a point E in a normal operation as a touch point F. The point E in the normal operation is a "reaction point A in which the reaction point position C belongs to the operation-corresponding region 19 (=the region where a touch is enabled in step SA7) and the reaction point value is an operation-corresponding region threshold value TH3 or more", among the reaction points A.

The operation-corresponding region threshold value TH3 is a threshold value set to such a value that the reaction point value of the corresponding reaction point A is the operation-corresponding region threshold value TH3 or more when the user brings the finger close to the detection surface 4 within the circular region 9 for the purpose of operating the ring-shaped guide member 6. In particular, the operation-corresponding region threshold value TH3 is set to such a value that the reaction point value of the reaction point A based on the finger is the operation-corresponding region threshold value TH3 or more during a period in which the user moves the finger along the inner side wall 10 to operate the ring-shaped guide member 6 in a normal mode. That is, the operation-corresponding region threshold value TH3 is a threshold value for detecting a touch performed within the circular region 9. Referring to FIG. 7B, when the finger is brought into contact with the bottom surface 12 within the circular region 9, a distance between the finger and a surface 20 of the display input device 1 is a distance L1. The operation-corresponding region threshold value is determined on the basis of a test or a simulation in advance in consideration of the distance L1.

In step SA7, the control unit 15 detects the point E in the normal operation as the touch point F on the basis of the reaction point position C and the reaction point value for each of the reaction points A determined in step SA4. A range on the coordinates of the operation-corresponding region 19 is defined in advance. No touch point F may be detected, or one or more touch points F may be detected. Hereinafter, the reaction point position C of the touch point F (not only the touch point F detected in the touch point detection processing before the start of the operation in step SA7 but also the touch point F detected in touch point detection processing after the start of the operation in step SA12 described below) is referred to as a "touch position G".

After the processing of step SA7, the control unit 15 determines whether there is the touch point F (=the point E in the normal operation) (step SA8). When there is no touch point F (step SA8: NO), the control unit 15 ends the processing of the flowchart FA. On the other hand, when there are one or more touch points F (step SA8: YES), the control unit 15 detects a touch for each of the touch points F (step SA9).

Next, for each of the touch points F, the control unit 15 records information indicating the coordinates of the touch position G in touch position transition data in association with information for identifying the current timing (as an example, date and time engraved to millisecond) (step SA10). As described above, in the touch position transition data, the touch position G is recorded in time series for each detected touch. The touch position transition data is stored in a predetermined storage area. The touch position transition data is data in which the detection result of the sensor panel 3 is reflected. Accordingly, processing executed with reference to the touch position transition data by the control unit 15 is processing executed based on the detection result of the sensor panel 3. After the processing of step SA10, the control unit 15 ends the processing of the flowchart FA.

Figure 18:
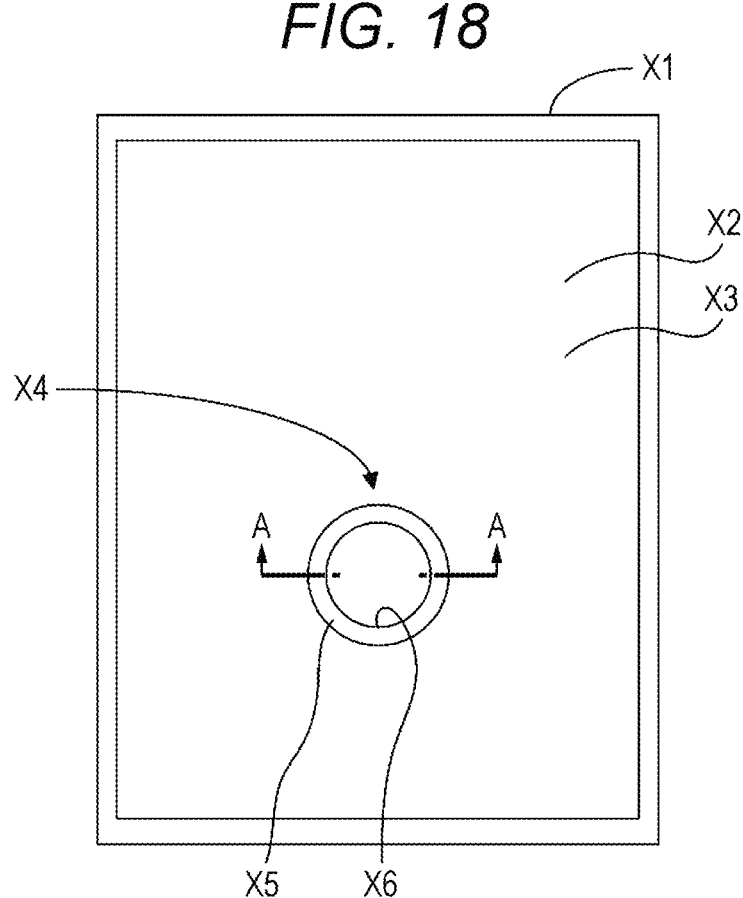
FIG. 18 is a front view illustrating an input device with a guide member in the related art.
Figure 19:
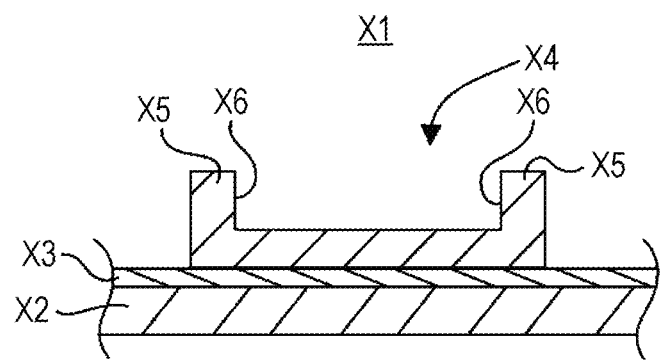
FIG. 19 is a cross-sectional view taken along the line A-A of FIG. 18.

As described above, in this embodiment, when the operation mode is the mode before the start of the operation (that is, when the start of the operation on the ring-shaped guide member 6 is not detected), the control unit 15 excludes the resting region 18 from the "region where a touch is enabled". The reason for this is as described using the input device X1 with a guide in the related art (FIGS. 18, 19, and 20) as an example, but will be described in more detail below.

That is, it is assumed that the user who is a person on board a vehicle in which the display input device 1 is provided desires to operate the ring-shaped guide member 6. At this time, the user can visually recognize the position of the ring-shaped guide member 6 and allow the own hand to access the ring-shaped guide member 6 with a pinpoint accuracy. On the other hand, the user can find the position of the ring-shaped guide member 6 not only by the above-described method but also by the following method. That is, the user moves the hand along the surface 20 around a position where the ring-shaped guide member 6 is likely to be present, or moves the hand along the surface 20 toward the position where the ring-shaped guide member 6 is likely to be present, without seeing the surface 20 of the display input device 1 at all or hardly.

When such a work is performed, any part of the hand touches the upright portion 8 of the ring-shaped guide member 6 in the process. This is because the upright portion 8 extends in the state of protruding forward with respect to the detection surface 4. The user recognizes that the finger touches the upright portion 8 through the tactile sense, thereby recognizing the position of the ring-shaped guide member 6 including the upright portion 8. Note that, the user who is the person on board the vehicle is often unable to firmly check the surface 20 of the display input device 1 over time, and it is very convenient for the user that the user can recognize the position of the ring-shaped guide member 6 without seeing the surface at all or hardly. Hereinafter, the work in which the user moves the hand to search for the guide member (not limited to the ring-shaped guide member 6 of this embodiment) is referred to as a "fumbling work". The fumbling work is not a work performed for the purpose of performing some input by operating the guide member, but is a work performed for finding the guide member.

As described above, the upright portion 8 is a portion that may be touched by the finger in the process of the fumbling work. That is, there is a possibility that the user touches the upright portion in a state where the user does not intend to make any input. It is assumed that the touch is also enabled for the resting region 18 in a state where the operation on the ring-shaped guide member 6 is not started. This causes the following problems. That is, in this case, a touch is detected when the finger touches the upright portion 8 and is rested on the upright portion during the fumbling work, and the input is enabled due to the touch, and there is a possibility that some action is executed. As described above, the fumbling work is not a work performed for the purpose of the user performing some input by operating the guide member, and the executed action is a malfunction that is not desired by the user. As described above, when the touch is also enabled for the resting region 18 in a state where the operation on the ring-shaped guide member 6 is not started, there is a problem that a malfunction may occur in the process of the fumbling work.

In order to solve this problem, when the operation mode is the mode before the start of the operation, that is, when the operation on the ring-shaped guide member 6 is not started, the control unit 15 of the operation detection device 14 according to this embodiment excludes the resting region 18 from the "region where a touch is enabled".

In a case where it is determined that the operation mode is the mode after the start of the operation in step SA5 (step SA5: "MODE AFTER START OF OPERATION"), the control unit 15 includes the resting region 18 in the "region where a touch is enabled", and sets the operation-corresponding region 19 and the resting region 18 as the "region where a touch is enabled" (step SA11). That is, when the operation mode is the mode after the start of the operation, the operation-corresponding region 19 and the resting region 18 correspond to the "region where a touch is enabled".

Next, the control unit 15 executes the touch point detection processing after the start of the operation (step SA12). More specifically, the control unit 15 detects the point E in the normal operation and a point H at resting as the touch points F. The point H at resting is a "reaction point A in which the reaction point position C belongs to the resting region 18 (=the region where a touch is enabled in step SA12), and the reaction point value is the resting region threshold value TH2 or more", among the reaction points A.

The resting region threshold value TH2 is set to such a value that the reaction point value of the corresponding reaction point A is the resting region threshold value TH2 or more when the finger of the user is rested on the upright portion 8. That is, the resting region threshold value TH2 is a threshold value for detecting that the finger is rested on the upright portion 8. Referring to FIG. 7B, when the finger of the user is rested on the upright portion 8 and the finger is in contact with a top surface 21 of the upright portion 8 (the upper surface of the upright portion 8), a distance between the finger and the surface 20 of the display input device 1 is a distance L2. In a situation where the finger is rested on the upright portion 8, the finger and the surface 20 of the display input device 1 do not come closer than the distance L2. The distance L2 is greater than the distance L1. Based on the above, the resting region threshold value TH2 is less than the operation-corresponding region threshold value TH3. The resting region threshold value TH2 is determined on the basis of a test or a simulation in advance in consideration of the distance L2. Since the value of the resting region threshold value TH2 is set from the above viewpoint, the point H at resting appears corresponding to the finger of the user when the finger of the user is rested on the upright portion 8.

In step SA12, the control unit 15 detects the touch point (=Point E in Normal Operation+Point H at Resting) based on the reaction point position C and the reaction point value for each of the reaction points A determined in step SA4. The range on the coordinates of the resting region 18 is defined in advance. No touch point F may be detected, or one or more touch points F may be detected.

After the processing of step SA12, the control unit 15 determines whether there is the touch point F (=Point E in Normal Operation+Point H at Resting) (step SA13). When there is no touch point (step SA13: NO), the control unit 15 ends the processing of the flowchart FA. On the other hand, when there are one or more touch points (step SA13: YES), the control unit 15 detects a touch for each of the touch points F (step SA14). Next, for each of the touch points F, the control unit 15 records the information indicating the coordinates of the touch position G in the touch position transition data in association with the information for identifying the current timing (step SA15). After the processing of step SA15, the control unit 15 ends the processing of the flowchart FA.

As described above, in this embodiment, when the operation mode is the mode after the start of the operation, that is, when the operation on the ring-shaped guide member 6 is started, the control unit 15 includes the resting region 18 in the "region where a touch is enabled". Accordingly, the following effects are obtained. That is, according to this embodiment, after the operation on the ring-shaped guide member 6 is started, the touch is also enabled in the resting region 18. Therefore, even in a case where the user moves the finger within the circular region 9 for the operation on the ring-shaped guide member 6 and the finger is rested on the upright portion 8, the touch is detected in the resting region 18. Therefore, when the user moves the finger within the circular region 9 for the operation on the ring-shaped guide member 6 and the finger is rested on the upright portion 8, it is not determined that the operation is interrupted, and it is possible to suppress the determination that the operation is interrupted against the intention of the user.

Figure 8:
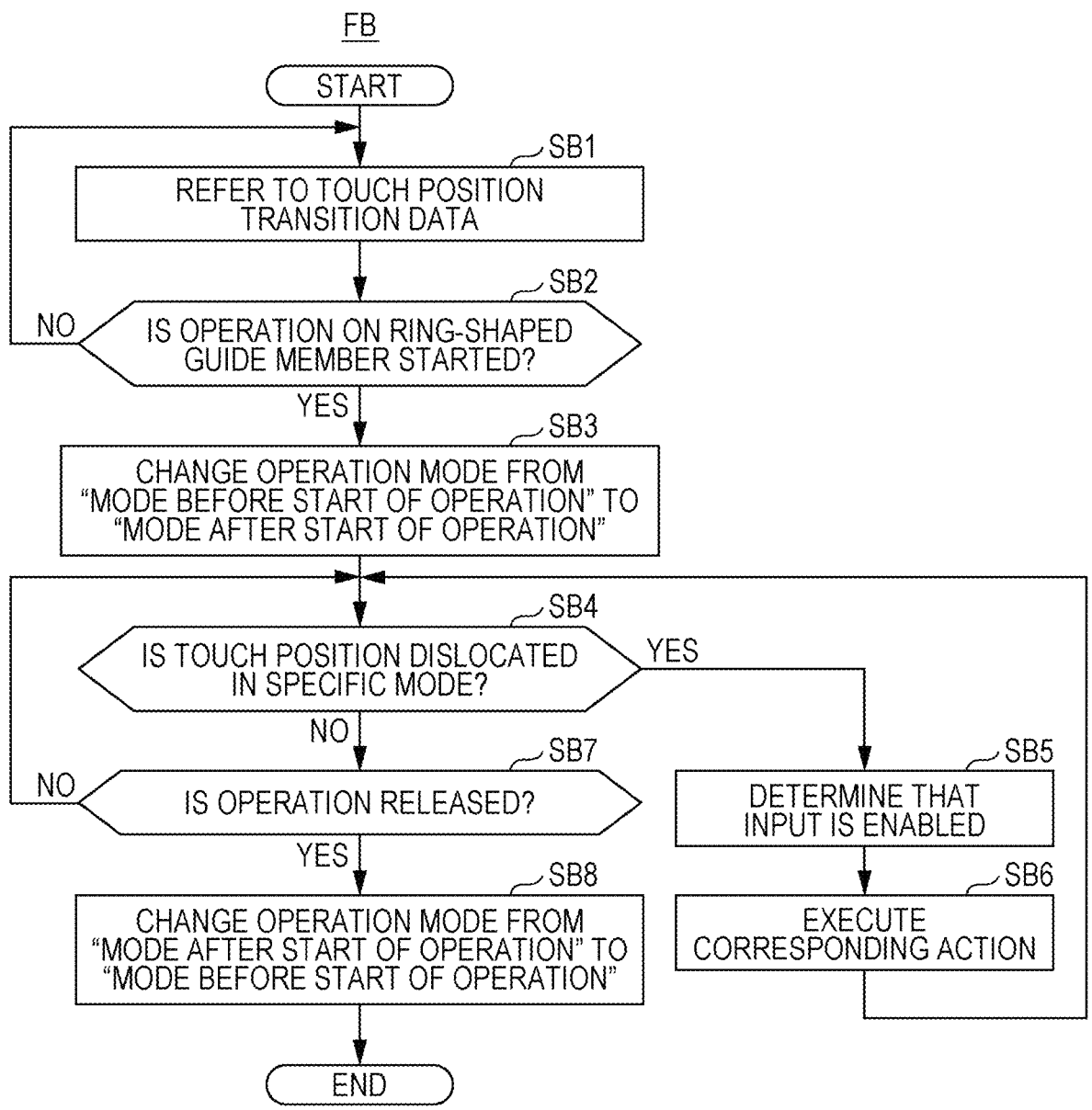
FIG. 8 is a flowchart illustrating an information processing method by the operation detection device according to one embodiment of the present disclosure.

Next, the processing of the operation detection device 14 regarding the detection of the operation on the ring-shaped guide member 6 will be described. A flowchart FB of FIG. 8 is a flowchart illustrating an example of an information processing method by the operation detection device 14 regarding the detection of the operation on the ring-shaped guide member 6. At the start of the processing of the flowchart FB of FIG. 8, it is assumed that the operation on the ring-shaped guide member 6 by the user is not started, and the operation mode is the mode before the start of the operation.

As illustrated in FIG. 8, the control unit 15 refers to the touch position transition data stored in a predetermined storage area (step SB1). Even in a case where the processing after step SB2 is not particularly described, the control unit 15 refers to the touch position transition data as necessary and executes the processing. As described above, in the touch position transition data, the touch position G is recorded in time series together with a detection timing for each detected touch. Next, the control unit 15 determines whether the operation on the ring-shaped guide member 6 is started on the basis of the touch position transition data (step SB2). Hereinafter, the processing of step SB2 will be described in detail.

In step SB2, the control unit 15 determines whether the touch position G is dislocated around the central portion O of the circular region 9 by a start angle threshold value TH4 (5° in this embodiment) or more in the clockwise direction Y1 or in the counterclockwise direction Y2 along the inner side wall 10 of the upright portion 8, on the basis of the touch position transition data. Hereinafter, a "mode in which the touch position G is dislocated around the central portion O of the circular region 9 by the start angle threshold value TH4 (=5°) or more in the clockwise direction Y1 or in the counterclockwise direction Y2 along the inner side wall 10 of the upright portion 8" is referred to as a "specification mode TY1 at start". Then, the control unit 15 determines that the operation on the ring-shaped guide member 6 is started when the touch position G is dislocated in the specification mode TY1 at start.

Figure 9A:
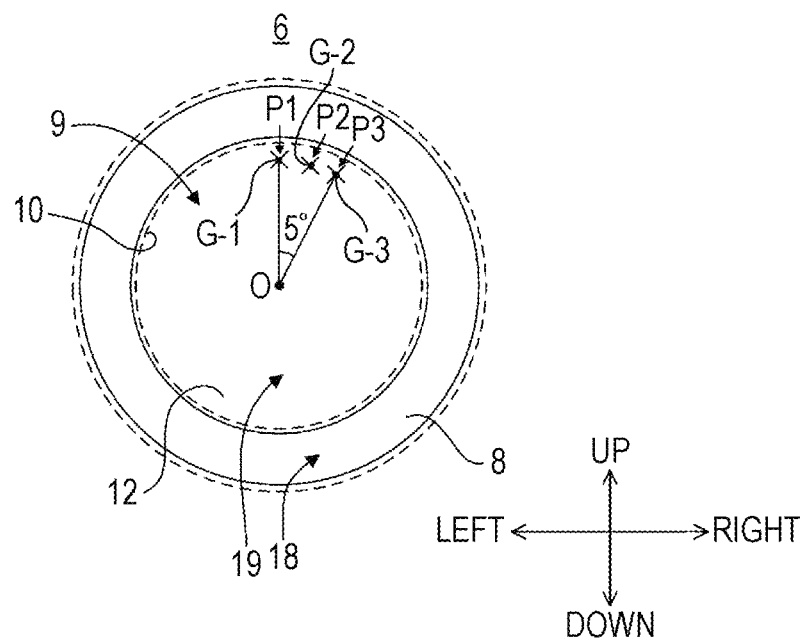
FIGS. 9A and 9B are front views illustrating the periphery of the ring-shaped guide member.
Figure 9B:
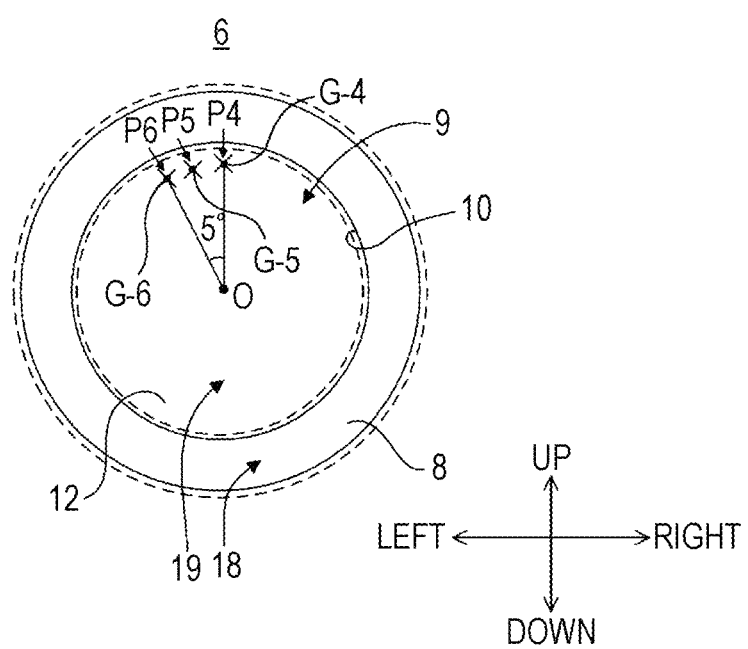

FIGS. 9A and 9B are front views illustrating the periphery of the ring-shaped guide member 6 to describe the processing of the control unit 15. For example, referring to FIG. 9A, it is assumed that a touch position G-1 appears at a position P1 at a timing T1, a touch position G-2 appears at a position P2 at a timing T2, and a touch position G-3 appears at a position P3 at a timing T3. The timings T1, T2, and T3 are timings that continuously appear at a predetermined cycle. Then, it is assumed that the angle of the central angle formed by the touch position G-1 and the touch position G-3 with respect to the central portion O of the circular region 9 is 5° (the angle does not need to be exactly 5°, and may be 5° or more). In this case, the control unit 15 determines that the operation on the ring-shaped guide member 6 is started at the timing T3. In FIGS. 9A and 9B, the angle formed by the touch position G-1 and the touch position G-3 with respect to the central portion O is greater than 5° in consideration of the visibility of the drawings. In the other drawings, when the angle is clearly shown in the drawings for the visibility of the drawings, the angle on the description may be different from the angle drawn in the drawings.

Note that, the control unit 15 determines whether the touch position G is dislocated in the specification mode at start for a "series of touch position groups". The "series of touch position groups" is a group of consecutive touch positions G. For example, in a situation where a touch position G-X, a touch position G-Y, and a touch position G-Z appear, in a case where the touch position G-X and the touch position G-Y are consecutive and the touch position G-Y and the touch position G-Z are consecutive, the {Touch Position G-X, Touch Position G-Y, Touch Position G-Z} is a group of continuous touch positions G, and thus, is the "series of touch position groups". The control unit 15 determines whether one touch position G and the other touch position G are consecutive by the following method. That is, the control unit 15 determines that the one touch position G and the other touch position G are consecutive when a detection timing of the one touch position G and a detection timing of the other touch position G continuously appear at a predetermined cycle and a separation distance between the one touch position G and the other touch position G is a certain distance or less. However, a method for determining whether one touch position G and the other touch positions G are consecutive is not limited to the illustrated method.

In the processing of FIG. 9A, the control unit 15 determines that the touch position G-1 and the touch position G-2 are consecutive and the touch position G-2 and the touch position G-3 are consecutive, and determines that {Touch Position G-1, Touch Position G-2, Touch Position G-3} is the "series of touch position groups" based on the determination. Then, the control unit 15 determines whether the touch position G is dislocated in the specification mode TY1 at start for {Touch Position G-1, Touch Position G-2, Touch Position G-3}, which is the "series of touch position groups".

Note that, the determination of whether the touch position G is dislocated in a specific mode for the "series of touch position groups" is performed not only for the case of the specification mode TY1 at start but also for the case of a mode TY2 in clockwise input and a mode TY3 in counterclockwise input described later. The same applies to the similar processing of a second embodiment.

Note that, the control unit 15 determines whether a certain touch position G is a position along the inner side wall 10 of the upright portion 8 based on whether the touch position G belongs to a region set in advance as a region along the inner side wall 10 of the upright portion 8. The same applies to the other processing of determining whether the touch position G is the position along the inner side wall 10 of the upright portion 8.

Referring to FIG. 9B, it is assumed that touch positions G-4, G-5, and G-6 appear at positions P4, P5, and P6 at consecutive timings T4, T5, and T6. {Touch Position G-4, Touch Position G-5, Touch Position G-6} is the "series of touch position groups", and the angle of the central angle formed by the touch position G-4 and the touch position G-6 with respect to the central portion O of the circular region 9 is 5°. In this case, the control unit 15 determines that the operation on the ring-shaped guide member 6 is started at the timing T6.

As described above, the control unit 15 determines whether the touch position G is dislocated around the central portion O of the circular region 9 by the start angle threshold value TH4 (5°) or more in the clockwise direction Y1 or in the counterclockwise direction Y2 along the inner side wall 10 of the upright portion 8, thereby determining whether the operation on the ring-shaped guide member 6 is started. Hereinafter, the validity of this processing will be described. That is, as described with reference to FIGS. 3A and 3B, in this embodiment, the input is enabled every time when the finger of the user rotates around the central portion O by "45°" in the clockwise direction Y1 or in the counterclockwise direction Y2. When the user starts the operation on the ring-shaped guide member 6 for the purpose of performing some input, a "state where the touch position G is dislocated around the central portion O of the circular region 9 by 5° or more in the clockwise direction Y1 or in the counterclockwise direction Y2 along the inner side wall 10 of the upright portion 8" always appears before the input is enabled. From the above, the processing described above is valid.

When the operation on the ring-shaped guide member 6 is not started (step SB2: NO), the control unit 15 returns the processing procedure to step SB1. On the other hand, when the operation on the ring-shaped guide member 6 is started (step SB2: YES), the control unit 15 changes the operation mode from the mode before the start of the operation to the mode after the start of the operation (step SB3). As described above, in the mode after the start of the operation, the touch is enabled in the resting region 18, the touch is detected in a predetermined case also in the resting region 18, and the touch position G corresponding to the detected touch is recorded in the touch position transition data.

Next, the control unit 15 determines whether the touch position G is dislocated in the mode TY2 in the clockwise input or in the mode TY3 in the counterclockwise input on the basis of the touch position transition data (step SB4). The mode TY2 in the clockwise input is a mode corresponding to an operation of rotating the finger around the central portion O by 45° in the clockwise direction Y1 as illustrated in FIG. 3A. Specifically, the mode TY2 in the clockwise input is a mode in which the touch position G is dislocated around the central portion O of the circular region 9 by an effective angle threshold value TH5 (45° in this embodiment) or more in the clockwise direction Y1. Similarly, the mode TY3 in the counterclockwise input is a mode corresponding to an operation of rotating the finger around the central portion O by 45° in the counterclockwise direction Y2 as illustrated in FIG. 3B. Specifically, the mode TY3 in the counterclockwise input is a mode in which the touch position G is dislocated around the central portion O of the circular region 9 by the effective angle threshold value TH5 (45° in this embodiment) or more in the counterclockwise direction Y2.

Figure 10A:
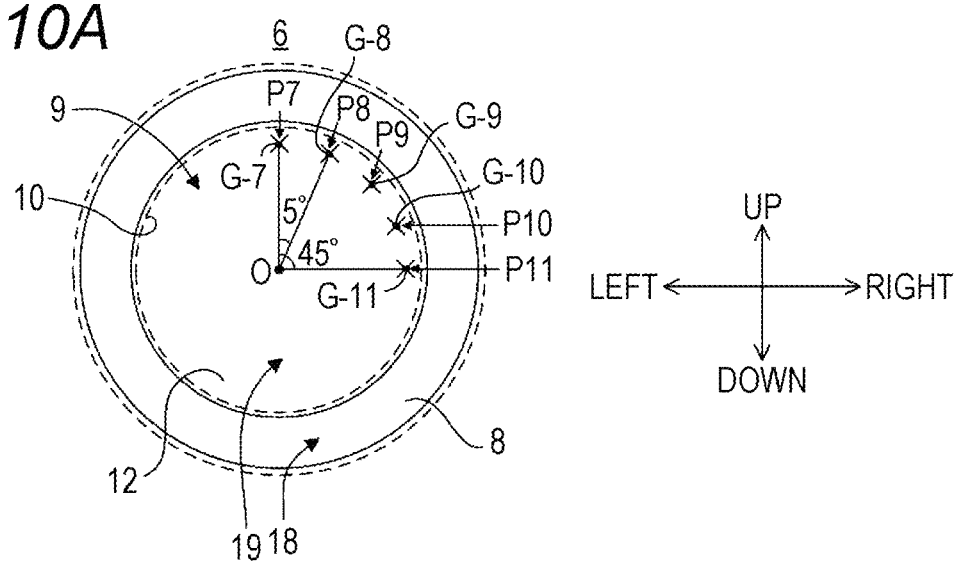
FIGS. 10A to 10C are front views illustrating the periphery of the ring-shaped guide member.
Figure 10B:
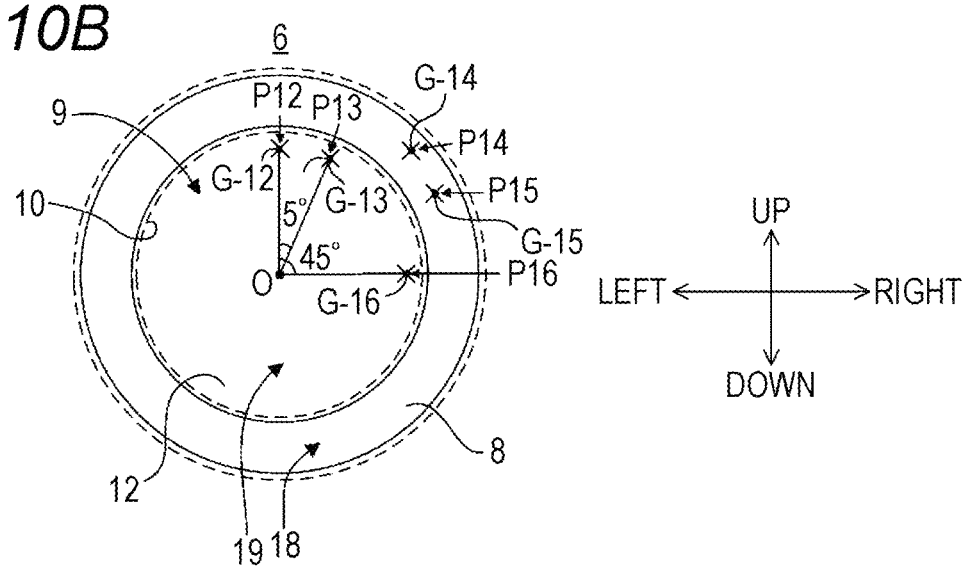
Figure 10C:
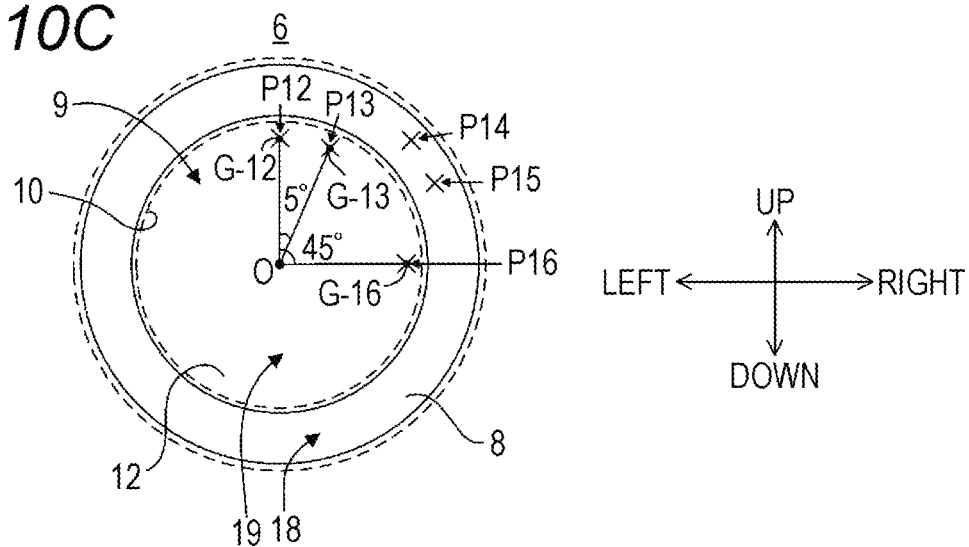

FIGS. 10A to 10C are front views illustrating the periphery of the ring-shaped guide member 6 to describe the processing of the control unit 15. For example, it is assumed that the finger of the user moves along the inner side wall 10 while being in contact with the inner side wall 10 of the upright portion 8, and accordingly, the touch position G appears in the mode illustrated in FIG. 10A. That is, as illustrated in FIG. 10A, it is assumed that touch positions G-7, G-8, G-9, G-10, and G-11 appear at positions P7, P8, P9, P10, and P11 at consecutive timings T7, T8, T9, T10, and T11. The touch positions G-7, G-8, G-9, G-10, and G-11 are a "series of touch position groups". It is assumed that the center angle formed by the touch position G-7 and the touch position G-8 with respect to the central portion O is 5°, and the center angle formed by the touch position G-7 and the touch position G-11 with respect to the central portion O is 45° (the angle does not need to be exactly 45°, and may be 45° or more). In this case, the control unit 15 determines that the operation on the ring-shaped guide member 6 is started at the timing T8, and accordingly, changes the operation mode from the mode before the start of the operation to the mode after the start of the operation, and further determines that the touch position G is dislocated in the mode TY2 in the clockwise input at the timing T11.

Furthermore, for example, it is assumed that, after the finger of the user starts to move along the inner side wall 10 while being in contact with the inner side wall 10 of the upright portion 8, the finger is rested on the upright portion 8 in the middle of the movement, and then, the finger returns to the inside of the inner side wall 10. Then, it is assumed that the touch position G appears in the mode illustrated in FIG. 10B along with the movement of the finger. That is, as illustrated in FIG. 10B, it is assumed that touch positions G-12, G-13, G-14, G-15, and G-16 appear at positions P12, P13, P14, P15, and P16 at consecutive timings T12, T13, T14, T15, and T16. The touch positions G-12, G-13, G-14, G-15, and G-16 are a "series of touch position groups". The positions P12, P13, and P16 are positions belonging to the operation-corresponding region 19, and positions P14 and P15 are positions belonging to the resting region 18. It is assumed that the center angle formed by the touch position G-12 and the touch position G-13 with respect to the central portion O is 5°, and the center angle formed by the touch position G-12 and the touch position G-16 with respect to the central portion O is 45°.

In this case, the control unit 15 determines that the operation on the ring-shaped guide member 6 is started at the timing T13, changes the operation mode from the mode before the start of the operation to the mode after the start of the operation, and further determines that the touch position G is dislocated in the mode TY2 in the clockwise input at the timing T16. Here, the touch position G-14 and the touch position G-15 belong to the resting region 18. However, at the timing T13, the operation mode is changed from the mode before the start of the operation to the mode after the start of the operation, and accordingly, the touch of the resting region 18 is enabled, and thus, the touch is detected by the control unit 15 for the touch position G-14 and the touch position G-15, and the touch position G is recorded in the touch position transition data.

Note that, it is assumed that the touch is not enabled in the resting region 18 regardless of whether there is no mode after the start of the operation as the operation mode and the operation is started. In this case, as shown in FIG. 10C, it is assumed that the reaction point position C of the reaction point A appears in the order of the positions P12, P13, P14, P15, and P16 at the consecutive timings T12, T13, T14, T15, and T16. As described above, the positions P12, P13, and P16 are positions belonging to the operation-corresponding region 19, and the positions P14 and P15 are positions belonging to the resting region 18. In this case, a touch is detected for the position P12, the position P13, and the position P16 (it is assumed that the reaction point value is the operation-corresponding region threshold value TH3 or more at any position), and the touch positions G-12, G-13, and G-16 are recorded in the touch position transition data. However, no touch is detected for the positions P14 and P15 (it is assumed that the reaction point value is the resting region threshold value TH2 or more at any position), and the touch position G is not recorded in the touch position transition data. In this case, the control unit 15 determines that the operation on the ring-shaped guide member 6 is interrupted between the timing T13 and the timing T14. Therefore, in such an assumed case, the control unit 15 does not determine that the touch position G is dislocated in the mode TY2 in the clockwise input.

In step SB4, when the control unit 15 determines that the touch position G is dislocated in the mode TY2 in the clockwise input or in the mode TY3 in the counterclockwise input (step SB4: YES), the processing procedure proceeds to step SB5. On the other hand, when it is determined that the touch position G is not dislocated in a specific mode (step SB4: NO), the control unit 15 allows the processing procedure to proceed to step SB7.

In step SB5, the control unit 15 determines that the input based on the operation of the user is enabled. Next, the control unit 15 executes an action corresponding to the mode of dislocating the touch position G (step SB6). In a simplified example of this embodiment, when the mode of dislocating the touch position G is the mode TY2 in the clockwise input, the control unit 15 increases the volume of the audio device by one unit. On the other hand, when the mode of dislocating the touch position G is the mode TY3 in the counterclockwise input, the control unit 15 decreases the volume of the audio device by one unit. After the processing of step SB6, the control unit 15 returns the processing procedure to step SB4.

As described above, in this embodiment, in a case where the touch position G is dislocated in the mode TY2 in the clockwise input or in the mode TY3 in the counterclockwise input, it is considered that the user intentionally performs the operation on the ring-shaped guide member 6, and it is determined that the input based on the operation of the user is enabled with this as a trigger, and an action corresponding to the mode of dislocating the touch position G is executed.

In step SB7, the control unit 15 determines whether the operation on ring-shaped guide member 6 is released. More specifically, the control unit 15 refers to the touch position transition data and determines whether there is no touch position G (=a state where no touch is detected). When there is no touch position G, the control unit 15 determines that the operation on the ring-shaped guide member 6 is released. On the other hand, when there are one or more touch positions G, the control unit 15 determines that the operation on the ring-shaped guide member 6 is not released. Note that, the absence of any touch position G means that no touch is detected in the operation-corresponding region 19 and the resting region 18, and it is estimated that the user releases the hand from the ring-shaped guide member 6 and releases the operation on the ring-shaped guide member 6.

In step SB7, in a case where it is determined that the operation on the ring-shaped guide member 6 is not released (step SB7: NO), the control unit 15 returns the processing procedure to step SB4. On the other hand, when it is determined that the operation on the ring-shaped guide member 6 is released (step SB7: YES), the control unit 15 changes the operation mode from the mode after the start of the operation to a change mode before the start of the operation (step SB8). After the processing of step SB8, the control unit 15 ends the processing of the flowchart FA. After the processing of the flowchart FA is ended, the control unit 15 starts the processing of step SA1 again.

As described above in detail, in this embodiment, the control unit 15 of the operation detection device 14 has a function of detecting that the operation on the ring-shaped guide member 6 (guide member) is started on the basis of the detection result of the sensor panel 3. Before detecting the start of the operation on the ring-shaped guide member 6, the control unit 15 excludes the resting region 18 corresponding to the region where the finger rested on the upright portion 8 can be positioned from the region where a touch is enabled, and after detecting the start of the operation on the ring-shaped guide member 6, the control unit includes the resting region 18 in the region where a touch is enabled.

According to this configuration, before the operation on the ring-shaped guide member 6 is started, the touch is not enabled in the resting region 18 corresponding to the region where the finger rested on the ring-shaped guide member 6 can be positioned, so that a malfunction is suppressed. In addition, after the operation on the ring-shaped guide member 6 is started, the touch is enabled in the resting region 18, and thus, even in a case where the finger is rested on the upright portion 8 in a process where the user is moving the finger during the operation, it is not determined that the operation is interrupted, and it is possible to suppress the determination that the operation is interrupted against the intention of the user.

MODIFICATION EXAMPLE

Figure 11:
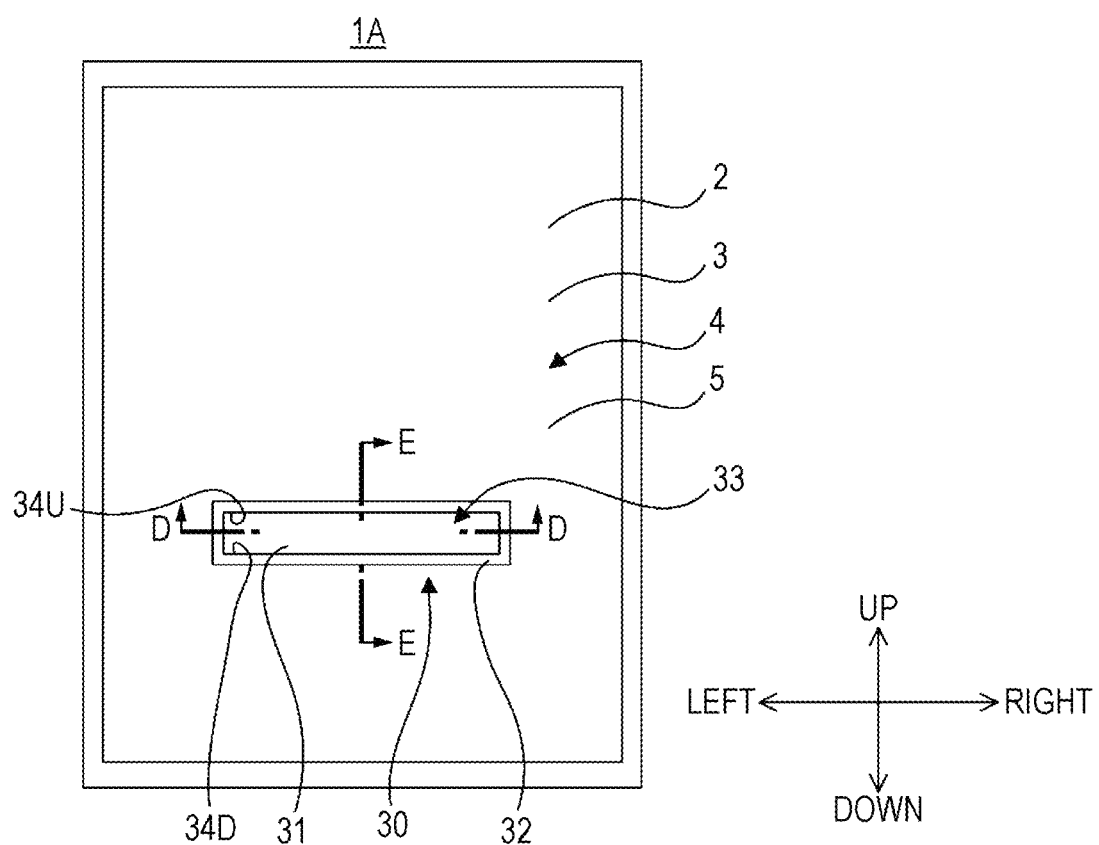
FIG. 11 is a front view of a display input device according to a modification example of the present disclosure.
Figure 12A:
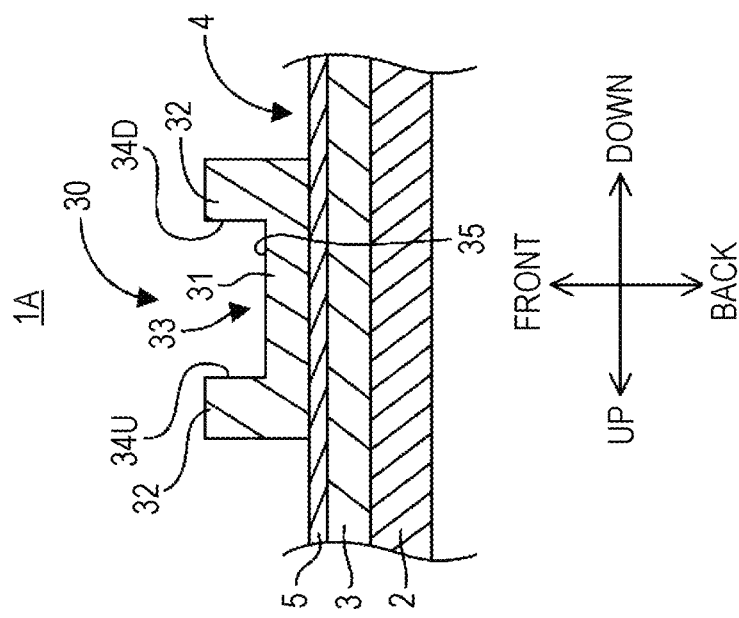
FIGS. 12A and 12B are cross-sectional views taken along the line D-D and a cross-sectional view taken along the line E-E of FIG. 11.

Next, a modification example will be described. In the following description of the modification example, the same reference numerals will be applied to the same elements as those of the above embodiment (including members that exhibit the same functions with the same structural features), and the detailed description thereof will be omitted. FIG. 11 is a front view of a display input device 1A according to this modification example. FIG. 12A is a cross-sectional view taken along the line D-D of FIG. 11, and FIG. 12B is a cross-sectional view taken along the line E-E of FIG. 11.

Figure 12B:
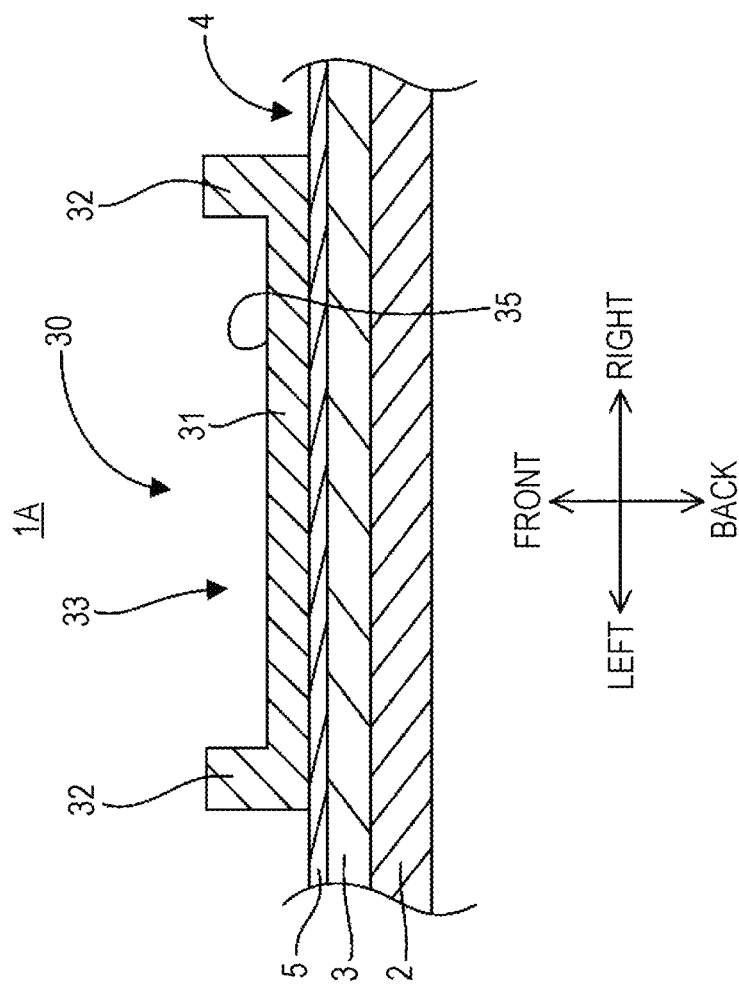

As illustrated in FIGS. 11 to 12B, a rectangular frame-shaped guide member 30 (guide member) is provided in the cover member 5 instead of the ring-shaped guide member 6 according to the first embodiment. The rectangular frame-shaped guide member 30 is fixed to the cover member 5 by adhesion or other units. That is, the rectangular frame-shaped guide member 30 is fixed to the detection surface 4 of the sensor panel 3 with the cover member 5. The rectangular frame-shaped guide member 30 is a transparent member containing a transparent material. However, the rectangular frame-shaped guide member 30 may not be transparent. In this embodiment, the rectangular frame-shaped guide member 30 is separate from the cover member 5, but these members may be integrated.

As illustrated in FIGS. 11 to 12B, the rectangular frame-shaped guide member 30 includes a plate-shaped base portion 31 of which back surface adheres to the cover member 5, and an upright portion 32 provided to surround the base portion 31. As illustrated in FIGS. 11 to 12B, the upright portion 32 is a portion having a rectangular frame shape in a front view, and an elongated rectangular region 33 is formed inside the upright portion. In this embodiment, the length of the rectangular region 33 in a longitudinal direction is approximately "8 cm". The upright portion 32 is a portion extending in the state of protruding forward with respect to the detection surface 4. In the upright portion 32, an inner side wall 34U (side wall) and an inner side wall 34D (side wall) are formed corresponding to a pair of long sides of the rectangular region 33. The inner side wall 34U and the inner side wall 34D are a pair of facing side walls. Hereinafter, the inner side wall 34U and the inner side wall 34D may be referred to as a "pair of inner side walls 34U and 34D". The pair of inner side walls 34U and 34D are formed to rise by a certain distance from a bottom surface 35 (the surface of the base portion 31 belonging to the rectangular region 33).

The rectangular frame-shaped guide member 30 is operated in the following mode. A first mode is an operation in which the finger of the user moves rightward along the pair of inner side walls 34U and 34D within the rectangular region 33. When the above operation is performed by the user, the control unit 15 of the operation detection device 14 enables the input and executes the corresponding action every time when the finger of the user moves "3 cm".

Figure 13:
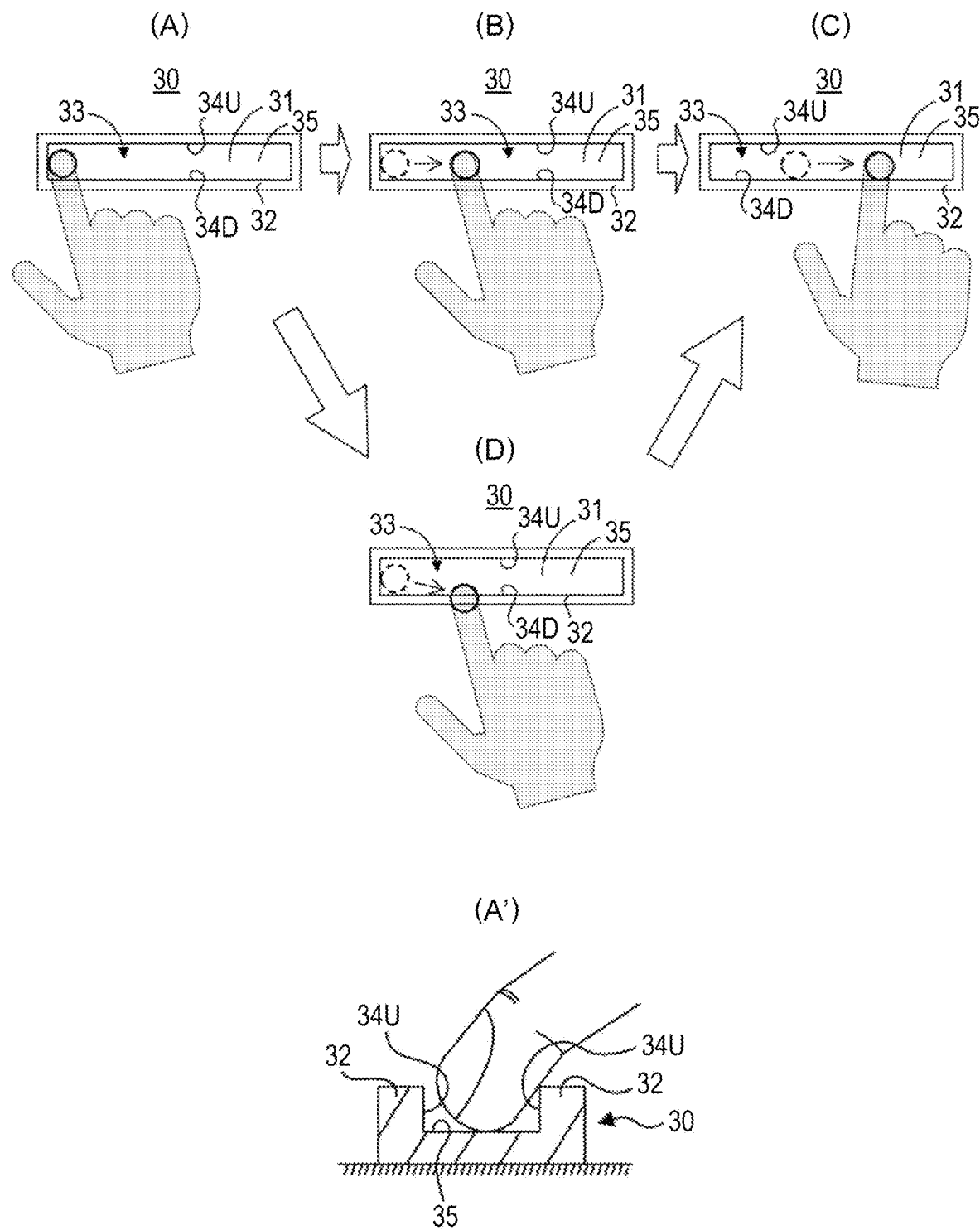
FIG. 13 is a diagram illustrating a usage mode of a rectangular frame-shaped guide member.

More specifically, FIG. 13 is a diagram illustrating a usage mode of the rectangular frame-shaped guide member. Referring to (A) in FIG. 13, first, the finger of the user is disposed to touch the bottom surface 35 of the rectangular region 33 of the rectangular frame-shaped guide member 30. In FIG. 13, a circle is marked at a point where the finger touches or approaches on the bottom surface 35 In (A') in FIG. 13, a part of the state of (A) seen from the side is illustrated as a cross-sectional view. Note that, a position at which the finger is initially disposed in the operation of the rectangular frame-shaped guide member 30 is not limited to the position illustrated in FIG. 3A, and may be any position in the rectangular region 33. The same applies to a second mode according to the operation of the rectangular frame-shaped guide member 30. Thereafter, as illustrated in (B) and (C) in FIG. 13, the finger of the user moves rightward along the pair of inner side walls 34U and 34D, whereby the operation on the rectangular frame-shaped guide member 30 is performed.

In a case where the operations illustrated in (A), (B), and (C) in FIG. 13 are performed, the control unit 15 of the operation detection device 14 detects that the finger moves 3 cm when the state of (A) in FIG. 13 is changed to the state of (B), enables the input, and executes the corresponding action. In this embodiment, similarly to the above embodiment, the control unit 15 executes the action of increasing the volume of the audio device (not illustrated) by one unit. Furthermore, the control unit 15 of the operation detection device 14 detects that the finger moves 3 cm when the state of (B) in FIG. 13 is changed to the state of (C), enables the input, and executes the corresponding action (the action of increasing the volume by one unit). In this manner, the user can gradually increase the volume of the audio device by moving the finger rightward along the pair of inner side walls 34U and 34D of the upright portion 32.

A second mode according to the operation of the rectangular frame-shaped guide member 30 is an operation in which the finger of the user moves leftward along the pair of inner side walls 34U and 34D within the rectangular region 33. When the above operation is performed by the user, the control unit 15 of the operation detection device 14 enables the input, and executes the corresponding action (an action of once decreasing the volume of the audio device) every time when the finger of the user moves "3 cm". The user can gradually decrease the volume of the audio device by moving the finger leftward while bringing the finger into contact with at least one of the pair of inner side walls 34U and 34D of the upright portion 32.

As described above, in the rectangular frame-shaped guide member 30 according to this modification example, the finger of the user moves along the pair of inner side walls 34U and 34D of the upright portion 32 in the rectangular region 33, whereby the operation on the rectangular frame-shaped guide member 30 is performed. During this operation, the finger may be rested on the upright portion 32 while the finger is moving along the pair of inner side walls 34U and 34D. (D) in FIG. 13 illustrates a state in which the finger is rested on the upright portion 32 at the timing of (B) in FIG. 13. In particular, the display input device 1A according to this embodiment is provided in a vehicle.

Therefore, the housing of the display input device 1A may vibrate due to the vibration of the engine and other factors, and a case in which the finger is rested on the upright portion 32 may easily occur due to the vibration.

The control unit 15 of the operation detection device 14 according to this modification example executes the processing of the flowchart FA in FIG. 5 regarding the touch detection function. However, in this modification example, the operation-corresponding region 37 and the resting region 38 are defined as follows, and an operation-corresponding region threshold value TH3' and a resting region threshold value TH2' are set as follows.

Figure 14A:
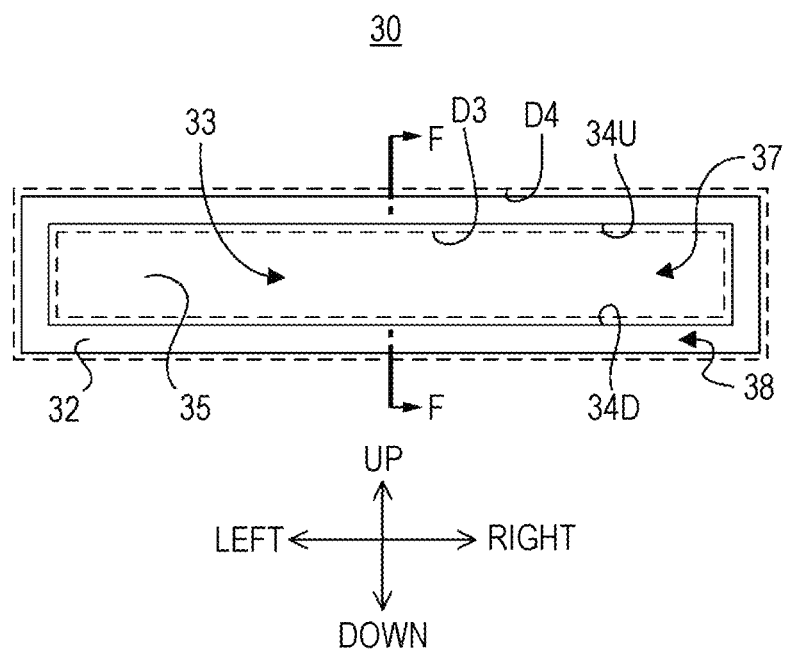
FIGS. 14A and 14B are diagrams used to describe the operation-corresponding region and the resting region.
Figure 14B:
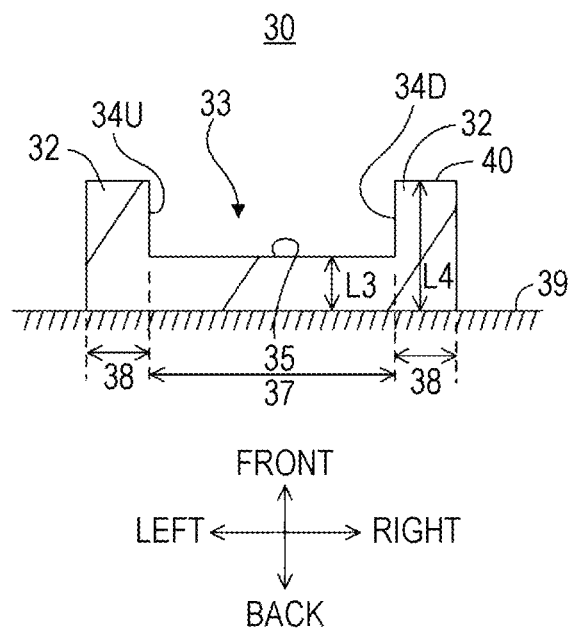

FIGS. 14A and 14B are views used to describe the operation-corresponding region 37 and the resting region 38, FIG. 14A is a front view of the periphery of the rectangular frame-shaped guide member 30, and FIG. 14B is a cross-sectional view taken along the line F-F of FIG. 14A. The operation-corresponding region 37 is a region where the "reaction point position C based on the finger positioned in the rectangular region 33 of the rectangular frame-shaped guide member 30" can be positioned. That is, when the finger approaches the detection surface 4 within the rectangular region 33, the reaction point position C is positioned within the operation-corresponding region 37. Therefore, while the finger is moving along the pair of inner side walls 34U and 34D within the rectangular region 33, the reaction point position C based on the finger is positioned within the operation-corresponding region 37. In FIGS. 14A and 14B, the operation-corresponding region 37 is clearly illustrated. In particular, in FIG. 14A, the operation-corresponding region 37 is a region inside a rectangular frame D3 indicated by a dotted line. The operation-corresponding region 37 is a region corresponding to the rectangular region 33, but the outer edge of the operation-corresponding region 37 does not necessarily coincide with the outer edge of the rectangular region 33.

On the other hand, the resting region 38 is a region where the "reaction point position C based on the finger rested on the upright portion 32" can be positioned. That is, the resting region 38 is a region corresponding to a "region where the finger rested on the upright portion 32 can be positioned". Therefore, in a situation where the finger is rested on the upright portion 32, the reaction point position C based on the finger is positioned within the resting region 38. FIGS. 14A and 14B clearly illustrate the resting region 38. In particular, in FIG. 14A, the resting region 38 is a region outside the rectangular frame D3 indicated by the dotted line and inside a rectangular frame D4 indicated by a dotted line. The resting region 38 is the region corresponding to the "region where the finger rested on the upright portion 32 can be positioned", but the outer edge of the resting region 38 does not necessarily coincide with the outer edge when the upright portion 32 is viewed from the front.

The operation-corresponding region threshold value TH3' is set to a value such that the reaction point value of the corresponding reaction point A is the operation-corresponding region threshold value TH3' or more when the user brings the finger close to the detection surface 4 within the rectangular region 33 for the purpose of operating the rectangular frame-shaped guide member 30. In particular, the operation-corresponding region threshold value TH3' is set to such a value that the reaction point value of the reaction point A based on the finger is the operation-corresponding region threshold value or more during a period in which the user moves the finger along the pair of inner side walls 34U and 34D to operate the rectangular frame-shaped guide member 30 in a normal mode. Referring to FIG. 14A, when the finger is brought into contact with bottom surface 35 within the rectangular region 33, a distance between the finger and a surface 39 of the display input device 1A is a distance L3. The operation-corresponding region threshold value is determined on the basis of a test or a simulation in advance in consideration of the distance L3. On the other hand, the resting region threshold value TH2' is set to such a value that the reaction point value of the corresponding reaction point A is the resting region threshold value TH2' or more when the finger of the user is rested on the upright portion 32. With reference to FIG. 14B, the distance between a top surface 40 of the upright portion 32 (the upper surface of the upright portion 32) and the surface 39 of the display input device 1A is a distance L4. In a situation where the finger is rested on the upright portion 32, the finger and the surface 39 of the display input device 1A do not come closer than the distance L4. The distance L4 is greater than the distance L3. Based on the above, the resting region threshold value TH2' is less than the operation-corresponding region threshold value TH3'. The resting region threshold value TH2' is determined on the basis of a test or a simulation in advance in consideration of the distance L4.

With regard to a touch position detection function, according to this modification example, the same effects as those of the above embodiment are obtained. That is, when the operation mode is the mode before the start of the operation, that is, when the operation on the rectangular frame-shaped guide member 30 is not started, the control unit 15 according to this modification example excludes the resting region 38 from the "region where a touch is enabled". For this reason, in a state where the operation on the rectangular frame-shaped guide member 30 is not started, the occurrence of a malfunction in the process of the fumbling work is suppressed. Furthermore, when the operation mode is the mode after the start of the operation, that is, after the operation on the rectangular frame-shaped guide member 30 is started, the control unit 15 includes the resting region 38 in the "region where a touch is enabled". Therefore, even when the user moves the finger within the rectangular region 33 for the operation on the rectangular frame-shaped guide member 30 and the finger is rested on the upright portion 32, the touch is detected in the resting region 38. As a result, when the user moves the finger within the rectangular region 33 for the operation on the rectangular frame-shaped guide member 30 and the finger is rested on the upright portion 32, it is not determined that the operation is interrupted, and it is possible to suppress the determination that the operation is interrupted against the intention of the user.

Next, the processing of the operation detection device 14 when the operation on the rectangular frame-shaped guide member 30 is detected will be described. A flowchart FC in FIG. 15 is a flowchart illustrating an example of an information processing method by the operation detection device 14 regarding the detection of the operation on the rectangular frame-shaped guide member 30. As it is clear from the comparison between FIG. 8 and FIG. 15, the control unit 15 according to this modification example executes step SC1 instead of the processing of step SB2 of the flowchart FA in FIG. 8, and executes step SC2 instead of the processing of step SB4.

In step SC1, the control unit 15 determines whether the touch position G is dislocated leftward or rightward by a start distance threshold value TH6 (1 cm in this modification example) or more along the pair of inner side walls 34U and 34D within the operation-corresponding region 37 on the basis of the touch position transition data. Hereinafter, a "mode in which the touch position G is dislocated leftward or rightward by the start distance threshold value TH6 (1 cm in this modification example) or more along the pair of inner side walls 34U and 34D" is referred to as a "specification mode TY4 at start". Then, the control unit 15 determines that the operation on the rectangular frame-shaped guide member 30 is started when the touch position G is dislocated in the specification mode TY4 at start.

Figure 16A:
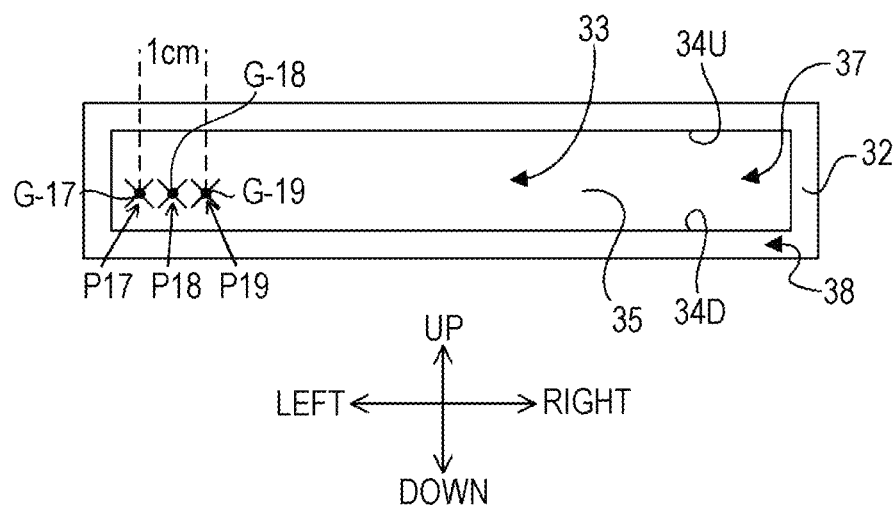
FIGS. 16A and 16B are front views illustrating the periphery of the rectangular frame-shaped guide member.

FIG. 16 is a front view illustrating the periphery of the rectangular frame-shaped guide member 30 to describe the processing of the control unit 15. For example, referring to FIG. 16A, it is assumed that touch positions G-17, G-18, and G-19 appear at positions P17, P18, and P19 at consecutive timings T17, T18, and T19. The touch positions G-17, G-18, and G-19 are a "series of touch position groups". It is assumed that a separation distance between the touch position G-17 and the touch position G-19 is 1 cm (the distance does not need to be exactly 1 cm, and may be 1 cm or more). In this case, the control unit 15 determines that the operation on the rectangular frame-shaped guide member 30 is started at the timing T19.

Figure 16B:
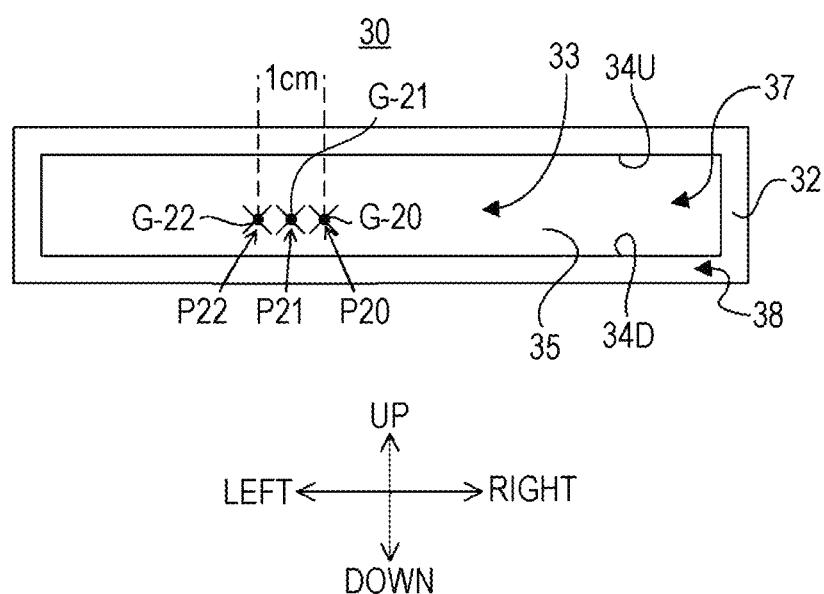

Referring to FIG. 16B, it is assumed that touch positions G-20, G-21, and G-22 appear at positions P20, P21, and P22 at consecutive timings T20, T21, and T22. The touch positions G-20, G-21, and G-22 are a "series of touch position groups". It is assumed that a separation distance between the touch position G-20 and the touch position G-22 is 1 cm (the distance does not need to be exactly 1 cm, and may be 1 cm or more). In this case, the control unit 15 determines that the operation on the rectangular frame-shaped guide member 30 is started at the timing T22.

As described above, in this embodiment, the control unit 15 determines whether the touch position G is dislocated 1 cm or more rightward or leftward along the pair of inner side walls 34U and 34D of the upright portion 32, thereby determining whether the operation on the rectangular frame-shaped guide member 30 is started. Hereinafter, the validity of this processing will be described. That is, as described with reference to FIG. 13, in this embodiment, the input is enabled every time when the finger of the user moves 3 cm rightward or leftward within the rectangular region 33. In a case where the user starts the operation on the rectangular frame-shaped guide member 30 with the purpose of performing some input, a "state in which the touch position G is dislocated 1 cm or more rightward or leftward along the pair of inner side walls 34U and 34D of the upright portion 32" always appears before the input is enabled. From the above, the processing described above is valid.

In a case where the operation on the rectangular frame-shaped guide member 30 is not started (step SC1: NO), the control unit 15 returns the processing procedure to step SB1. On the other hand, when the operation on the rectangular frame-shaped guide member 30 is started (step SC1: YES), the control unit 15 allows the processing procedure to proceed to step SB3.

In step SC2, the control unit 15 determines whether the touch position G is dislocated in a mode TY5 in right input or in a mode TY6 in left input on the basis of the touch position transition data. The mode TY5 in the right input is a mode corresponding to the operation of moving the finger rightward within the rectangular region 33 to enable the input as illustrated in (A) in FIG. 13. Specifically, the mode TY5 in the right input is a mode in which the touch position G is dislocated rightward by an effective distance threshold value TH7 (3 cm in this embodiment) or more. Similarly, the mode TY6 in the left input is a mode corresponding to the operation of moving the finger leftward within the rectangular region 33 to enable the input as illustrated in (B) in FIG. 13. Specifically, the mode TY6 in the left input is a mode in which the touch position G is dislocated leftward by the effective distance threshold value TH7 (3 cm in this embodiment) or more.

Figure 17A:
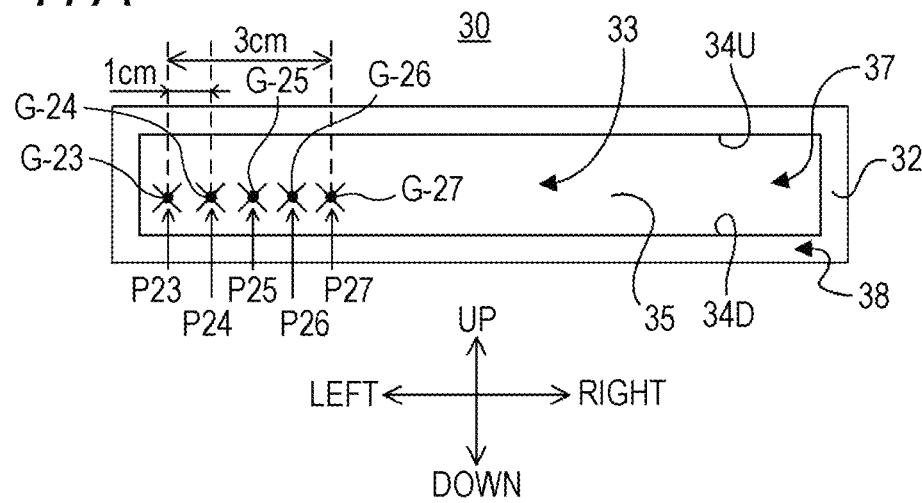
FIGS. 17A to 17C are front views illustrating the periphery of the rectangular frame-shaped guide member.

FIG. 17 is a front view illustrating the periphery of the rectangular frame-shaped guide member 30 to describe the processing of the control unit 15. For example, it is assumed that the finger of the user moves along the pair of inner side walls 34U and 34D of the upright portion 32, and accordingly, the touch position G appears in the mode illustrated in FIG. 17A. That is, as illustrated in FIG. 17A, it is assumed that touch positions G-23, G-24, G-25, G-26, and G-27 appear at positions P23, P24, P25, P26, and P27 at consecutive timings T23, T24, T25, T26, and T27. The touch positions G-23, G-24, G-25, G-26, and G-27 are a "series of touch position groups". It is assumed that a distance between the touch position G-23 and the touch position G-24 is 1 cm, and a distance between the touch position G-23 and the touch position G-27 is 3 cm (the distance does not need to be exactly 3 cm, and may be 3 cm or more). In this case, the control unit 15 determines that the operation on the rectangular frame-shaped guide member 30 is started at the timing T24, and accordingly, changes the operation mode from the mode before the start of the operation to the mode after the start of the operation, and further determines that the touch position G is dislocated in the mode TY5 in the right input at the timing T27.

Figure 17B:
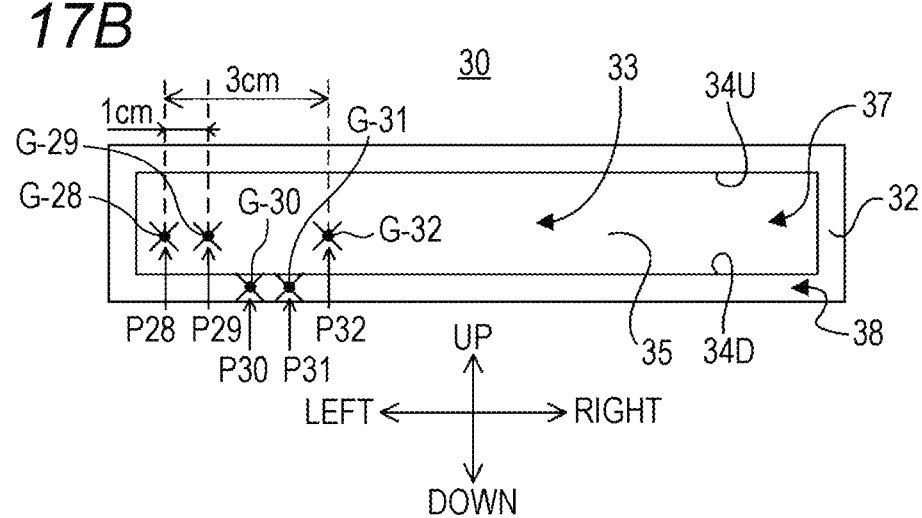

Furthermore, for example, it is assumed that after the finger of the user starts to move along the pair of inner side walls 34U and 34D of the upright portion 32, the finger is rested on the upright portion 32 in the middle of the movement, and then, the finger returns to the inside of the pair of inner side walls 34U and 34D. Then, it is assumed that the touch position G appears in the mode illustrated in FIG. 17B along with the movement of the finger. That is, as illustrated in FIG. 17B, it is assumed that touch positions G-28, G-29, G-30, G-31, and G-32 appear at positions P28, P29, P30, P31, and P32 at consecutive timings T28, T29, T30, T31, and T32. The touch positions G-28, G-29, G-30, G-31, and G-32 are a "series of touch position groups". The positions P28, P29, and P32 are positions belonging to the operation-corresponding region 37, and the positions P30 and P31 are positions belonging to the resting region 38. It is assumed that a distance between the touch position G-28 and the touch position G-29 is 1 cm, and a distance between the touch position G-28 and the touch position G-32 is 3 cm.

In this case, the control unit 15 determines that the operation on the rectangular frame-shaped guide member 30 is started at the timing T29, changes the operation mode from the mode before the start of the operation to the mode after the start of the operation, and further determines that the touch position G is dislocated in the mode TY5 in the right input at the timing T32. Here, the touch position G-30 and the touch position G-31 belong to the resting region 38. However, at the timing T29, the operation mode is changed from the mode before the start of the operation to the mode after the start of the operation, and accordingly, the touch of the resting region 38 is enabled, and thus, the touch is detected by the control unit 15 for the touch position G-30 and the touch position G-31, and the touch position G is recorded in the touch position transition data.

Figure 17C:
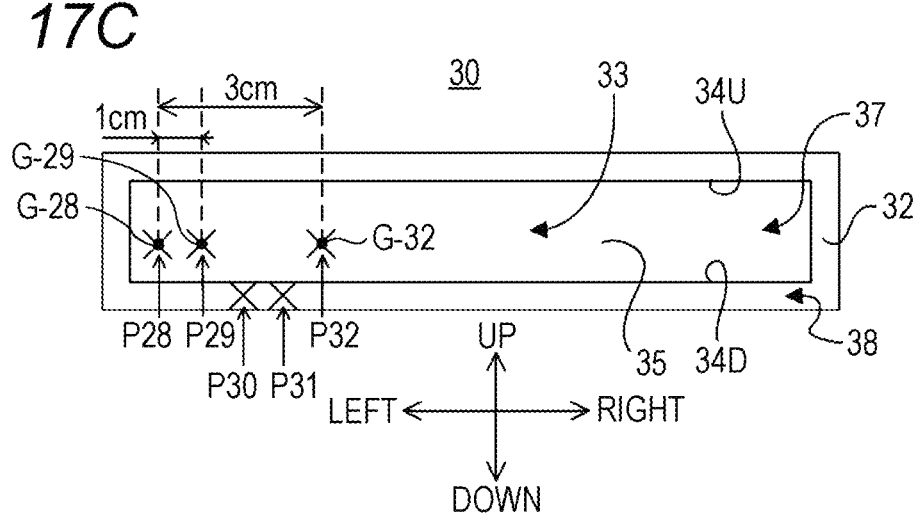

Note that, it is assumed that a touch is not enabled in the resting region 38 regardless of whether there is no mode after the start of the operation as the operation mode and the operation is started. In this case, as shown in FIG. 17C, it is assumed that the reaction point position C of the reaction point A appears at the positions P28, P29, P30, P31, and P32 at the consecutive timings T28, T29, T30, T31, and T32. As described above, the positions P28, P29, and P32 are positions belonging to the operation-corresponding region 37, and the positions P31 and P32 are positions belonging to the resting region 38. In this case, a touch is detected for the position P28, the position P29, and the position P32 (it is assumed that the reaction point value is the operation-corresponding region threshold value TH3' or more at any position), and the touch positions G-28, G-29, and G-32 are recorded in the touch position transition data. However, no touch is detected for the positions P30 and P31 (it is assumed that the reaction point value is the resting region threshold value TH2' or more at any position), and the touch position G is not recorded in the touch position transition data. In this case, the control unit 15 determines that the operation on the rectangular frame-shaped guide member 30 is interrupted between the timing T29 and the timing T30. Therefore, in such an assumed case, the control unit 15 does not determine that the touch position G is dislocated in the mode TY5 in the right input.

In step SC2, when the control unit 15 determines that the touch position G is dislocated in the mode TY5 in the right input or in the mode TY6 in the left input (step SC2: YES), the processing procedure proceeds to step SB5. On the other hand, when it is determined that the touch position G is not dislocated in a specific manner (step SC2: NO), the control unit 15 allows the processing procedure to proceed to step SB7.

In this embodiment, the same effects as those of the above embodiment are also obtained. That is, before the operation on the rectangular frame-shaped guide member 30 is started, the touch is not enabled in the resting region 38 corresponding to the region where the finger that has gotten on the rectangular frame-shaped guide member 30 can be positioned, so that the malfunction is suppressed. In addition, after the operation on the rectangular frame-shaped guide member 30 is started, the touch is enabled in the resting region 38, and thus, even in a case where the finger is rested on the upright portion 32 while the user moves the finger during the operation, it is not determined that the operation is interrupted, and it is possible to suppress the determination that the operation is interrupted against the intention of the user.

Although one embodiment (including the modification example) of the present disclosure has been described above, the above embodiment is merely an example given to embody the present disclosure, and the technical scope of the present disclosure should not be interpreted in a limited manner. That is, the present disclosure can be implemented in various forms without departing from the gist or main features of the present disclosure.

For example, in the above embodiment, the action executed when it is determined that the input is enabled is the adjustment of the volume of the audio device, but it is natural that the action is not limited thereto. As an example, the action may be an action of moving a cursor or an action of adjusting the temperature of an air conditioner.

For example, the operation detection device 14 and an external device may cooperatively execute some of the processing pieces described as being executed by the functional block of the operation detection device 14. In this case, the operation detection device 14 and the external device cooperate with each other to function as an "operation detection device". As an example, the external device is a cloud server capable of communicating with the operation detection device 14 via a network.

For example, the embodiment may include the provision of a program executed by a computer of the operation detection device 14 or a recording medium in which the program is recorded in a computer readable manner. As the recording medium, a magnetic or optical recording medium or a semiconductor memory device can be used. Specific examples of the recording medium include a portable or fixed recording medium such as a flexible disk, a hard disk drive (HDD), a compact disk read only memory (CD-ROM), a digital versatile disk (DVD), a Blu-ray (registered trademark) Disc, a magneto-optical disc, a flash memory, and a card-type recording medium. The recording medium may be a recording medium included in the operation detection device 14 or the external device connected to the operation detection device 14.

For example, for the exemplified flowchart, the order of processing may be changed, the processing may be more finely divided, processing may be added, or the processing may be deleted, as long as the purpose can be realized and there is no contradiction in the processing.

In each of the above-described embodiments, the operation detection device 14 has been described as a device independent of the sensor panel 3, but the operation detection device 14 does not need to be an independent device that can be distributed independently. As an example, a circuit or a unit mounted on the same housing as the sensor panel 3 may be used.

What is claimed is:

1. An operation detector for detecting an operation on a guide member fixed onto a detection surface of an electrostatic capacitive sensor panel, the guide member being a member that has an upright portion extending in a state of protruding forward with respect to the detection surface, and is to be used for an operation in which a finger of a user moves along a side wall of the upright portion while being in contact with the side wall, the device comprising:
  a control unit comprising a processor, the control unit configured to detect that an operation on the guide member is started on the basis of a detection result of the sensor panel, exclude a resting region corresponding to a region in which the finger rested on the upright portion can be positioned from a region in which a touch is enabled before the start of the operation on the guide member is detected, and include the resting region in the region in which the touch is enabled after the start of the operation on the guide member is detected.

2. The operation detector according to claim 1, wherein:
  the control unit determines whether a touch position is dislocated in a specific mode in the region in which the touch is enabled when it is not detected that the operation on the guide member is started, and determines that the operation on the guide member is started when the touch position is dislocated in the specific mode.

3. The operation detector according to claim 1, wherein:
  the upright portion is a ring-shaped portion in a front view in which a circular region is formed inside,
  the guide member is a member be used for the operation in which the finger of the user moves along the side wall while being in contact with the side wall inside the upright portion, and,
  the control unit determines whether a touch position is dislocated in a specific mode in an operation-corresponding region that corresponds to the circular region and is the region in which the touch is enabled when it is not detected that the operation on the guide member is started, and determines that the operation on the guide member is started when the touch position is dislocated in the specific mode.

4. The operation detector according to claim 3, wherein:
the control unit determines whether the touch position is dislocated by a predetermined angle or more along the side wall inside the upright portion with a central portion of the circular region as a center within the operation-corresponding region, and determines that the operation on the guide member is started when the touch position is dislocated.

5. The operation detector according to claim 1, wherein:
the upright portion is a rectangular frame-shaped portion in a front view in which a rectangular region having an elongated rectangular shape is formed inside,
the guide member is a member to be used for an operation in which the finger of the user moves along a pair of facing side walls of the upright portion in the rectangular region, and
the control unit determines whether a touch position is dislocated in a specific mode in an operation-corresponding region that corresponds to the rectangular region and is the region in which the touch is enabled when it is not detected that the operation on the guide member is started, and determines that the operation on the guide member is started when the touch position is dislocated in the specific mode.

6. The operation detector according to claim 5, wherein:
the control unit determines whether the touch position is dislocated by a predetermined distance or more along the pair of side walls within the operation-corresponding region, and determines that the operation on the guide member is started when the touch position is dislocated.

7. An operation detection unit comprising:
an input device including an electrostatic capacitive sensor panel and a guide member that is fixed onto a detection surface of the sensor panel, the guide member having an upright portion extending in a state of protruding forward with respect to the detection surface, and is to be used for an operation in which a finger of a user moves along a side wall of the upright portion while being in contact with the side wall; and
an operation detector including a control unit comprising a processor that detects an operation on the guide member is started on the basis of a detection result of the sensor panel, excludes a resting region corresponding to a region in which the finger rested on the upright portion can be positioned from a region in which a touch is enabled before the start of the operation on the guide member is detected, and includes the resting region in the region in which the touch is enabled after the start of the operation on the guide member is detected.

8. An information processing method by an operation detector detecting an operation on a guide member that is fixed to a detection surface of an electrostatic capacitive sensor panel, the guide member having an upright portion extending in a state of protruding forward with respect to the detection surface, and is to be used for an operation in which a finger of a user moves along a side wall of the upright portion while being in contact with the side wall, the method comprising:
allowing a control unit comprising a processor to exclude a resting region corresponding to a region in which the finger rested on the upright portion can be positioned from a region in which a touch is enabled before the start of the operation on the guide member is detected; and
allowing the control unit to include the resting region in the region in which the touch is enabled after the start of the operation on the guide member is detected.

* * * * *